(12) United States Patent
Hasegawa et al.

(10) Patent No.: US 9,177,367 B2
(45) Date of Patent: Nov. 3, 2015

(54) IMAGE PROCESSING APPARATUS AND IMAGE PROCESSING METHOD

(71) Applicant: FUJIFILM Corporation, Tokyo (JP)

(72) Inventors: Ryou Hasegawa, Saitama (JP); Seiji Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/566,862

(22) Filed: Dec. 11, 2014

(65) Prior Publication Data

US 2015/0093027 A1    Apr. 2, 2015

Related U.S. Application Data

(63) Continuation of application No. PCT/JP2013/062000, filed on Apr. 24, 2013.

(30) Foreign Application Priority Data

Jun. 12, 2012 (JP) ................................. 2012-132898

(51) Int. Cl.
*G06K 9/00* (2006.01)
*G06T 5/00* (2006.01)
(Continued)

(52) U.S. Cl.
CPC . *G06T 5/002* (2013.01); *G06T 5/10* (2013.01); *H04N 1/58* (2013.01); *H04N 9/646* (2013.01)

(58) Field of Classification Search
CPC . G06K 9/40; H04N 1/40062; H04N 1/40087; H04N 1/4052; H04N 1/409; H04N 1/46; H04N 1/58; H04N 1/60; H04N 1/6022; H04N 9/04; H04N 9/07; H04N 9/64; H04N 9/646; G06T 1/00; G06T 1/58; G06T 5/00; G06T 5/002; G06T 5/10; G06T 5/20; G06T 2207/10024; G06T 2207/20016; G06T 2207/20028; G06T 2207/20064
See application file for complete search history.

(56) References Cited

U.S. PATENT DOCUMENTS 6,876,468 B1 *   4/2005   Kanno et al. ................... 358/1.9
7,945,111 B2 *   5/2011   Ishiga ............................ 382/263
(Continued)

FOREIGN PATENT DOCUMENTS

JP       10-112803 A    4/1998
JP       2002-222416 A   8/2002
(Continued)

OTHER PUBLICATIONS

International Preliminary Report on Patentability, issued in PCT/JP2013/062000, dated Sep. 5, 2014.
International Search Report, issued in PCT/JP2013/062000, dated Jul. 30, 2013.
(Continued)

*Primary Examiner* — Jose Couso
(74) *Attorney, Agent, or Firm* — Birch, Stewart, Kolasch & Birch, LLP

(57) ABSTRACT

An image processing apparatus for processing image data formed by a set of pixel data includes a real space filter processing unit and a color space filter processing unit, wherein the real space filter processing unit calculates a real space weighting coefficient and performs weighted average of pixel data according to filter processing of an edge preservation type; pixel data of at least a target pixel of pixel data used in the color space filter processing unit is pixel data calculated by the real space filter processing unit; and of the pixel data which the color space filter processing unit uses for the weighted average, the pixel data of the target pixel is pixel data calculated by the real space filter processing unit, and the pixel data of a peripheral pixel is pixel data forming the image data before being input to the real space filter processing unit.

21 Claims, 12 Drawing Sheets

(51) Int. Cl.
*H04N 1/58* (2006.01)
*G06T 5/10* (2006.01)
*H04N 9/64* (2006.01)

(56) References Cited

U.S. PATENT DOCUMENTS

2006/0038899 A1 2/2006 Tamaru et al.
2007/0242875 A1 10/2007 Tanaka et al.
2009/0160992 A1 6/2009 Inaba et al.

FOREIGN PATENT DOCUMENTS

| | | |
|---|---|---|
| JP | 2006-60661 A | 3/2006 |
| JP | 2007-288439 A | 11/2007 |
| JP | 2009-153013 A | 7/2009 |

OTHER PUBLICATIONS

Written Opinion of the International Searching Authority, issued in PCT/JP2013/062000, dated Jul. 30, 2013.

* cited by examiner

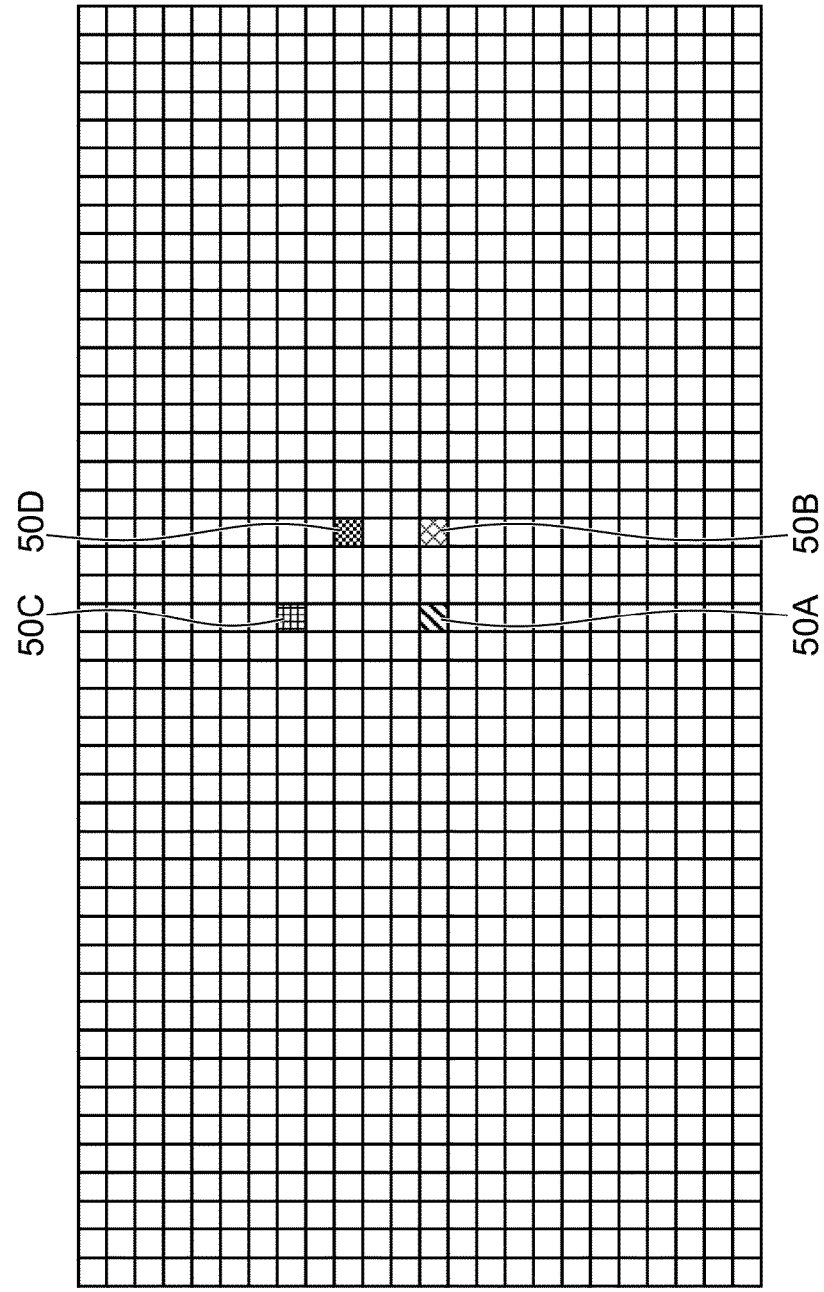

FIG.5A

HORIZONTAL ONE-DIMENSIONAL 7-TAP

VERTICAL ONE-DIMENSIONAL 7-TAP

| 1 | 2 | 3 | 4 | 3 | 2 | 1 |

×

| 1 |
| 2 |
| 3 |
| 4 |
| 3 |
| 2 |
| 1 |

FILTER COEFFICIENT

FIG.5B

| 1 | 1 | 1 | 1 | 1 | 1 | 1 |
|---|---|---|---|---|---|---|
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |

CALCULATE AVERAGE VALUE IN 7×7

PROCESSING CONCEPTUAL DIAGRAM

ENTIRE DISTRIBUTION BECOMES SMALL

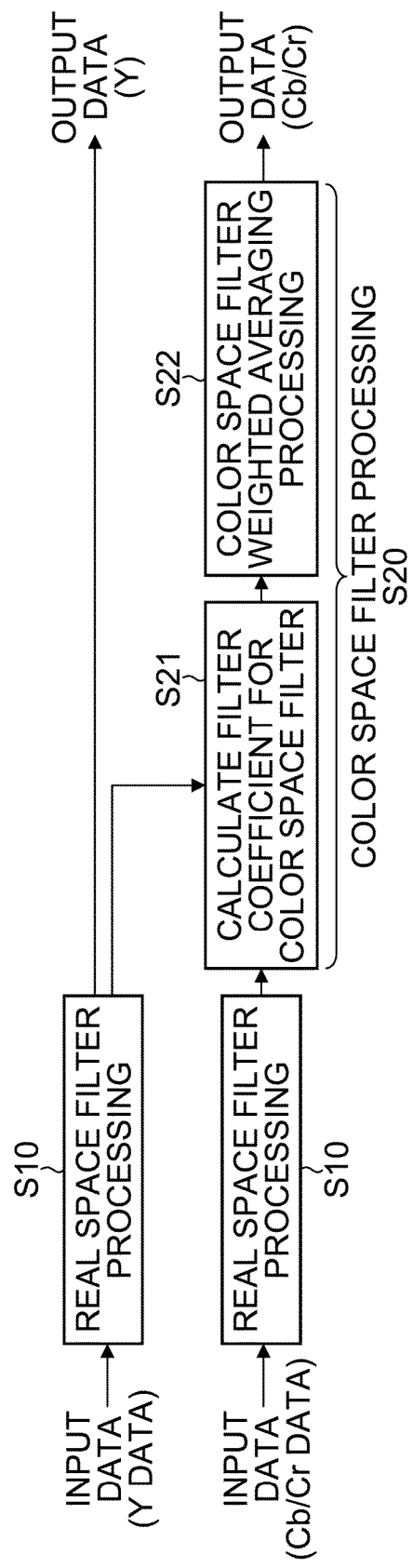

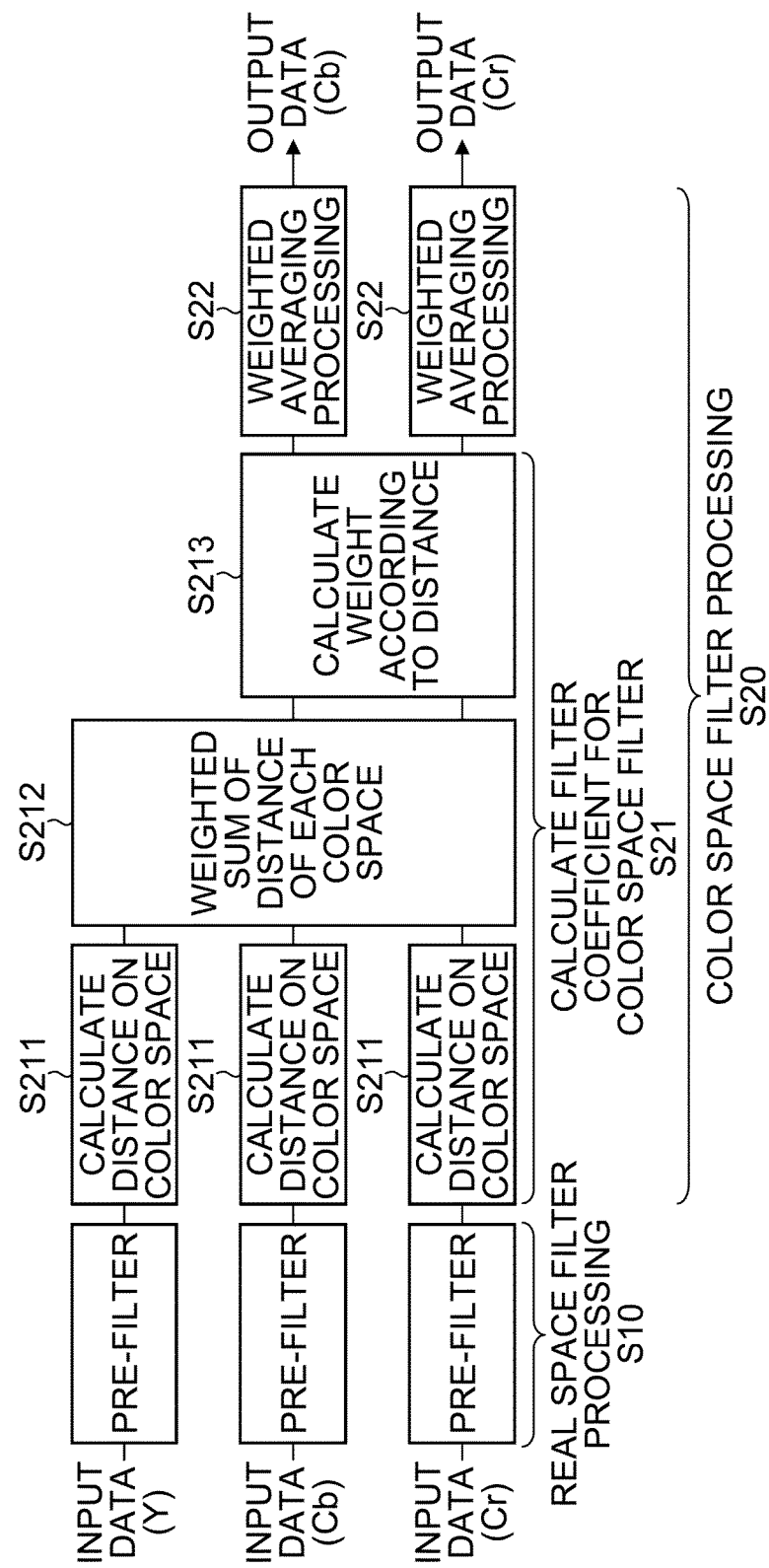

IMAGE PROCESSING APPARATUS AND IMAGE PROCESSING METHOD

CROSS-REFERENCE TO RELATED APPLICATIONS

This application is a Continuation of PCT International Application No. PCT/JP2013/062000 filed on Apr. 24, 2013, which claims priority under 35 U.S.C. §119(a) to Japanese Patent Application No. 2012-132898 filed on Jun. 12, 2012. Each of the above applications is hereby expressly incorporated by reference, in their entirety, into the present application.

BACKGROUND OF THE INVENTION

1. Field of the Invention

The present invention relates to an image processing apparatus and an image processing method, and in particular, relates to a technique that reduces noise while preserving an edge of an image.

2. Description of the Related Art

In the field of imaging devices such as a camera, there is a case where digital image data acquired through an imaging element (such as a CCD or a CMOS) includes a noise component, and various methods of removing this noise component are proposed.

For example, Japanese patent application publication No. 2007-288439 discloses an image processing apparatus that applies noise reduction processing to a color image of RGB. According to this image processing apparatus, the distance between a target pixel and a peripheral pixel therearound on the RGB color space is calculated, a weighting coefficient for each peripheral pixel is calculated according to the distance on the color space, and image data of peripheral pixels in addition to the target pixel is subjected to weighted average processing to calculate the pixel value of the target pixel.

Moreover, Japanese patent application publication No. 2002-222416 discloses an image quality improvement apparatus that removes noise from an image. According to this image improvement apparatus, covariance data between color channels in image data is calculated, a filter which minimizes the mean square error in the k-dimensional color space with an original image that does not deteriorate by noise is derived according to this covariance data and covariance data between color channels of prescribed noise, and noise reduction processing is performed by this derived filter.

Moreover, Japanese patent application publication No. 10-112803 discloses an image processing apparatus that removes noises by use of a reference value recorded in a reference value buffer. According to this image processing apparatus, an output pixel value is determined by weight calculation with respect to an input pixel value.

Various methods related to noise reduction/removal are proposed as described above, but each method has difference in noise reduction effects, and in such a case where the noise level is relatively large (high), an excellent noise reduction effect cannot be necessarily acquired.

For example, Japanese patent application publication No. 2007-288439 discloses an image processing method according to which the distance on the color space is calculated after low-pass filter processing is performed. In a case where only the low-pass filter is simply applied, the edge preservability may become poor though it is still effective for the noise reduction effect. In particular, in a case where the noise level is large, defects such as color spread (blur) and color loss in a color boundary part of an image may occur.

Moreover, even in the image improvement apparatus of Japanese patent application publication No. 2002-222416, when noise of a large level is included in image data, the separation performance between the image signal component and the noise component deteriorates. As a result, in a case where the image improvement apparatus of Japanese patent application publication No. 2002-222416 is used, strong noise may remain and color spread may occur in a color boundary part.

Moreover, in the image processing apparatus of Japanese patent application publication No. 10-112803, since weight averaging is performed on the basis of only an input pixel value and a reference value, a resultant noise reduction effect is inherently small.

Therefore, it is desired to propose a new technique of effectively removing image noise while preventing color spread or the like in a color boundary part and preserving the original edge (boundary part) sharpness of an image even in a case where a noise component of a large level is included in image data.

SUMMARY OF THE INVENTION

The present invention has been contrived in view of the above-mentioned circumstances, an object of the present invention being to provide a technique of reducing image noise while preventing defects such as color spread.

One aspect of the present invention is directed to an image processing apparatus that processes image data formed by a set of pixel data of a plurality of pixels, the image processing apparatus comprising: a real space filter processing unit that calculates a real space weighting coefficient for each peripheral pixel according to a distance on a real space between a target pixel and a peripheral pixel located around the target pixel among the plurality of pixels of image data input, and performs weighted average of pixel data of the target pixel and pixel data of the peripheral pixel using the real space weighting coefficient to calculate pixel data of the target pixel; and a color space filter processing unit that calculates a color space weighting coefficient for each peripheral pixel according to a distance on a color space between a target pixel and a peripheral pixel located around the target pixel among the plurality of pixels, and performs weighted average of pixel data of the target pixel and pixel data of the peripheral pixel using the color space weighting coefficient to calculate pixel data of the target pixel, wherein: the real space filter processing unit calculates the real space weighting coefficient and performs the weighted average of pixel data, according to filter processing of an edge preservation type; and the pixel data of at least the target pixel of the pixel data used in the color space filter processing unit is the pixel data calculated by the real space filter processing unit.

According to this aspect, the real space filter processing based on the filter processing of an edge preservation type is performed in the previous stage and the color space filter processing is performed in the subsequent stage. Therefore, it is possible to reduce image noise by the color space filter processing in a state where defects such as color spread are prevented by the filter processing of an edge preservation type and an edge (color boundary part) is excellently preserved.

The "real space" here means a space based on the pixel disposition relationship on image data, and the "distance on a real space" is an index that reflects the actual distance between a plurality of pixels of the image data and directly or indirectly shows the distance between a processing object pixel (target pixel) and another peripheral pixel (a peripheral pixel). Therefore, the real distance between pixels on an image can be directly called "distance on a real space", and what indirectly shows the actual distance between pixels by use of another index (parameter) showing the actual distance between pixels can be called "distance on a real space". For example, the distance on the real space can be expressed in pixel units, and a peripheral pixel adjacent to a target pixel can be expressed as a pixel having the distance "corresponding to one pixel" from the target pixel on the real space.

Moreover, the "color space" here may be a color space described three-dimensionally, and a color space based on "R/GB" or "Y/Cb/Cr" is provided as a typical color space. Moreover, the "distance on a color space" is an index that reflects the degree of separation based on colors between a plurality of pixels of image data, and directly or indirectly shows the degree of approximation related to colors of a processing object pixel (target pixel) and another peripheral pixel. Therefore, the distance on the color space can be directly called "distance on the color space", and what indirectly shows the degree of approximation or degree of separation of colors between pixels by use of another index (parameter) showing the distance on the color space can be called "distance on the color space". For example, regarding elements that define the color space (e.g. each of R/G/B elements in the RGB color space and each of Y/Cb/Cr elements in the YCbCr color space), the sum total of the square of the difference absolute value between pixel data of a target pixel and pixel data of a peripheral pixel may be acquired, and the square root of this sum total may be expressed as "distance on the color space". Moreover, a result of performing weighting with respect to each of the elements that define the color space may be expressed as "distance on the color space". Moreover, a result of adding the difference absolute value between the pixel data of the target pixel and the pixel data of the peripheral pixel in the elements that define the color space without squaring it, may be expressed as "distance on the color space". Moreover, the difference absolute value between the pixel data of the target pixel and the pixel data of the peripheral pixel is acquired with respect to each of the pixels that defines the color space, and the difference absolute value is weighted with respect to each of the elements that defines the color space without squaring the difference absolute value, and a result of adding the weighted difference absolute value in the elements that define the color space may be expressed as "distance on the color space". In addition, a value (weighted value) acquired by multiplying these distances on the color space by a predetermined coefficient may be expressed as "distance on the color space".

Moreover, the "filter processing of an edge preservation type" here means filtering processing in which an image edge (color boundary part) is excellently preserved. For example, if the difference absolute value of pixel data between a target pixel and a peripheral pixel is within a predetermined threshold, processing in which the average value of image data (color difference data in this example) is calculated in the range of the set thereof may be included in the "filter processing of an edge preservation type" here. Moreover, another processing that can excellently preserve an image edge (color boundary part) may be included in the "filter processing of an edge preservation type".

Desirably, the image data includes image data related to color; and the real space filter processing unit calculates the real space weighting coefficient and performs the weighted average of pixel data, with respect to the image data related to color, according to filter processing of an edge preservation type.

According to this aspect, since the real space filter processing of an edge preservation type is applied to the image data related to color, it is possible to reduce image noise in a state where color spread or the like is prevented and an edge is excellently preserved. Here, as the "image data related to color", for example, image data of RGB can be used.

Desirably, the image data includes image data related to luminance and image data related to color difference; and the real space filter processing unit calculates the real space weighting coefficient and performs the weighted average of pixel data, with respect to at least the image data related to color difference of the image data related to luminance and the image data related to color difference, according to filter processing of an edge preservation type.

According to this aspect, since the real space filter processing of an edge preservation type is applied to at least image data related to color difference, it is possible to reduce image noise in a state where color spread or the like is prevented and an edge is excellently preserved. Also, as the "image data related to color difference" here, for example, image data of Cr/Cb can be used.

Desirably, of the pixel data which the color space filter processing unit uses to calculate the distance on the color space between the target pixel and the peripheral pixel, the pixel data of the target pixel is the pixel data calculated by the real space filter processing unit, and the pixel data of the peripheral pixel is the pixel data forming the image data before being input to the real space filter processing unit.

According to this aspect, based on the pixel data of the target pixel subjected to the real space filter processing and the pixel data of the peripheral pixel not subjected to the real space filter processing, the color space filter processing unit acquires the distance on the color space between the target pixel and the peripheral pixel. Even in this case, it is possible to reduce image noise by the color space filter processing in a state where defects such as color spread are prevented and an edge (color boundary part) is excellently preserved.

Desirably, of the pixel data which the color space filter processing unit uses for the weighted average with the color space weighting coefficient, the pixel data of the target pixel is the pixel data calculated by the real space filter processing unit, and the pixel data of the peripheral pixel is the pixel data forming the image data before being input to the real space filter processing unit.

According to this aspect, based on the pixel data of the target pixel subjected to the real space filter processing and the pixel data of the peripheral pixel not subjected to the real space filter processing, the color space filter processing unit performs weighted average calculation using the color space weighting coefficient. Even in this case, it is possible to reduce image noise by the color space filter processing in a state where defects such as color spread are prevented and an edge (color boundary part) is excellently preserved.

Desirably, the color space filter processing unit calculates the distance on the color space between the target pixel and the peripheral pixel and performs the weighted average with the color space weighting coefficient, using the pixel data calculated by the real space filter processing unit.

According to this aspect, the color space filter processing in the color space filter processing unit can be performed on the basis of the pixel data of the target pixel and the pixel data of the peripheral pixel that have been subjected to the real space filter processing, it is possible to perform edge preservation and noise reduction very effectively.

Desirably, the peripheral pixel that is an object of the pixel data used in each of the real space filter processing unit and the color space filter processing unit is adjacent to at least any of the target pixel and other peripheral pixels that are objects of the pixel data used in each of the real space filter processing unit and the color space filter processing unit.

According to this aspect, the real space filter processing and the color space filter processing are performed on the basis of the pixel data of the target pixel and the peripheral pixel which are adjacent to each other. By using the pixel data of adjacent pixels, it is possible to perform the real space filter processing and the color space filter processing, easily and effectively.

Desirably, the peripheral pixel that is an object of the pixel data used in the color space filter processing unit is not adjacent to any of the target pixel and other peripheral pixels that are objects of the pixel data used in the color space filter processing unit.

According to this aspect, the color space filter processing is performed on the basis of the pixel data of the target pixel and the peripheral pixel that are mutually spaced apart. By using the pixel data of pixels that are spaced apart, it is possible to utilize pixel data of pixels in a relatively wide range.

Desirably, the color space is based on RGB.

According to this aspect, it is possible to perform the color space filter processing on the basis of the distance on the RGB color space.

Desirably, the color space is based on luminance and a color difference.

According to this aspect, it is possible to perform color space filter processing on the basis of the distance on the luminance/color difference (Y/Cb/Cr, and so on) color space.

Desirably, the real space filter processing unit receives an input of image data related to luminance and image data related to color difference and calculates pixel data by performing the calculation of the real space weighting coefficient and the weighted average on each of the image data related to luminance and the image data related to color difference, the color space filter processing unit receives an input of the image data related to luminance and the image data related to color difference and calculates pixel data by performing the calculation of the color space weighting coefficient and the weighted average on the image data related to color difference using the image data related to luminance, and the image processing apparatus outputs image data related to luminance based on the pixel data calculated in the real space filter processing unit and image data related to color difference based on the pixel data calculated in the color space filter processing unit.

According to this aspect, when the image data related to luminance and color difference is input to the real space filter processing unit, the image data related to luminance data subjected to image processing in the real space filter processing unit is output from the image processing apparatus, and the image data related to color difference subjected to image processing in the real space filter processing unit and the color space filter processing unit is output from the image processing apparatus. By this means, it is possible to acquire image data with reduced image noise in a state where color spread or the like are prevented and an image edge is excellently preserved.

Another aspect of the present invention is directed to an image processing method that processes image data formed by a set of pixel data of a plurality of pixels, the image processing method comprising: a real space filter processing step of calculating a real space weighting coefficient for each peripheral pixel according to a distance on a real space between a target pixel and a peripheral pixel located around the target pixel among the plurality of pixels of image data input, and performing weighted average of pixel data of the target pixel and pixel data of the peripheral pixel using the real space weighting coefficient to calculate pixel data of the target pixel; and a color space filter processing step of calculating a color space weighting coefficient for each peripheral pixel according to a distance on a color space between a target pixel and a peripheral pixel located around the target pixel among the plurality of pixels, and performing weighted average of pixel data of the target pixel and pixel data of the peripheral pixel using the color space weighting coefficient to calculate pixel data of the target pixel, wherein: in the real space filter processing step, the real space weighting coefficient is calculated and the weighted average of pixel data is performed, according to filter processing of an edge preservation type; and the pixel data of at least the target pixel of the pixel data used in the color space filter processing step is the pixel data calculated in the real space filter processing step.

According to the present invention, calculation of a real space weighting coefficient and weighted average of pixel data in the real space filter processing include "filter processing of an edge preservation type", and therefore the real space filter processing can be performed while a boundary part (edge part) of an image can be preserved in good condition. Thus, the color space filter processing is performed on the basis of an image data in which an image boundary part is preserved in good condition, and therefore image noise can be effectively reduced while defects such as color blur can be prevented

BRIEF DESCRIPTION OF THE DRAWINGS

FIG. 4 is a schematic diagram illustrating a disposition example of a plurality of pixels.

FIG. 5A exemplifies a real space filter used in real space filter processing and illustrates a separation-type real space filter combining a horizontal one-dimensional 7-tap filter and a vertical one-dimensional 7-tap filter.

FIG. 5B exemplifies a real space filter used in real space filter processing and illustrates a matrix-type (two-dimensional) real space filter combining 7×7 tap filters in the horizontal and vertical directions.

FIG. 7 is a diagram illustrating a relationship between real space filter processing and color space filter processing.

FIG. 8 is a diagram illustrating the flow of the calculation of a filter coefficient for a color space filter.

DESCRIPTION OF THE PREFERRED EMBODIMENTS

In the following, an embodiment of the present invention is described with reference to the accompanying drawings. Here, the following components are merely exemplification, and each component can be arbitrarily realized by arbitrary hardware or software or a combination of both.

The present invention relates to a technique of reducing image noise while preventing color spread or the like in a color boundary part, and is applicable to all machinery that can perform processing of reducing/removing noise in image data. Therefore, the present invention can be realized by, for example, an imaging device such as a camera, a computer to which an imaging device is connected, or software installed in a computer (a program to cause the computer to execute the following processing step (procedure)). This software (such as a program) may be recorded in a non-transitory computer-readable medium such as a ROM.

Figure 1:
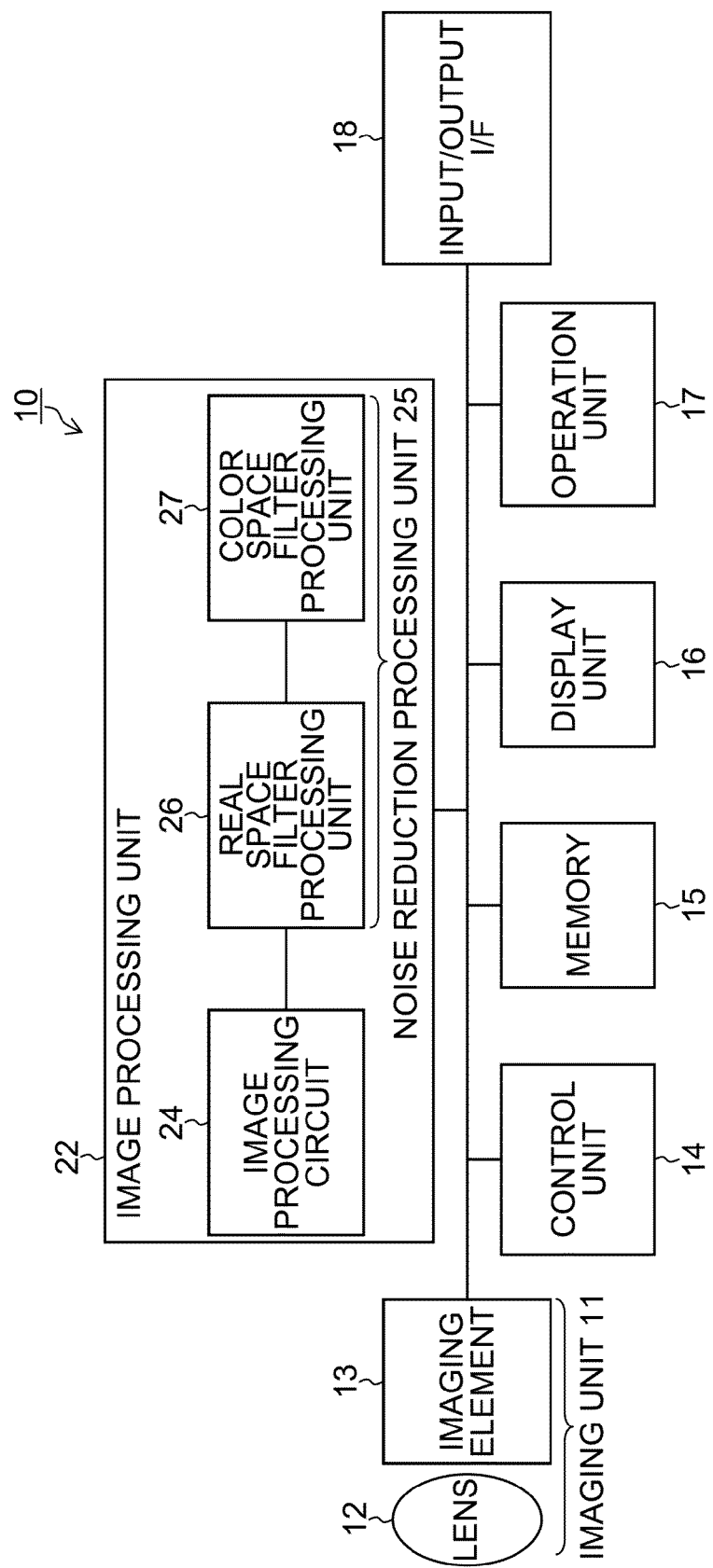
FIG. 1 is a functional block diagram illustrating one example in which the present invention is applied to an imaging device (digital camera).

FIG. 1 is a functional block diagram illustrating one example in which the present invention is applied to an imaging device (digital camera), and particularly is a diagram illustrating blocks related to noise reduction processing.

An imaging device 10 includes an imaging unit 11, an image processing unit (image processing apparatus) 22, a control unit 14, a memory 15, display unit (such as a liquid crystal display) 16, an operation unit 17 and a signal input/output I/F (interface) 18 which are connected with each other.

The imaging unit 11 is a part to acquire imaging data (image data) by taking an image of an object, and is configured to include a lens 12 and an imaging element (such as a CCD or a CMOS) 13, and so on. The imaging element 13 has a configuration in which a plurality of light-receiving elements are two-dimensionally disposed in pixel units.

The image processing unit 22 performs image processing for image quality improvement on image data imaged and acquired in the imaging unit 11 and performs compression processing of the image data. In this example, in particular, in addition to an image processing circuit 24 that performs various kinds of processing such as WB (white balance) adjustment processing, a noise reduction processing unit 25 that reduces/removes image noise included in the image data is installed in the image processing unit 22. The noise reduction processing unit 25 includes a real space filter processing unit 26 that applies real space filter processing to the image data and a color space filter processing unit 27 that applies color space filter processing to the image data.

Details of the image processing in the image processing unit 22 are described later, but, in this example, first the real space filter processing is performed as pre-filter processing in the previous stage of the color space filter processing, and the color space filter processing is performed after this real space filter processing. In a case where color difference noise is simply reduced only with a real space filter, color spread (blur) or color loss may be caused in a color boundary. Meanwhile, in a case where filter processing is simply performed on the color space to reduce the color difference noise, if the color spread or the color loss is suppressed, the degree of essential noise reduction becomes weak. For example, in a case where a target pixel includes a strong noise component, since the distance between the target pixel and peripheral pixels on the color space is large, there is a possibility that, even if the filter processing is performed on the color space, noise components are not sufficiently reduced and remain as image noise.

Therefore, in the following embodiment, by performing real space filter processing in the previous stage first, noise components of strong intensity are removed. By this means, it is possible to increase a noise reduction effect by color space filter processing in the subsequent stage, and it is also possible to acquire effects of suppression of color spread and color loss, which cannot be acquired only by real space filter processing.

Details of an image processing method including the real space filter processing and the color space filter processing are described later (see FIG. 3, and so on).

The memory 15 illustrated in FIG. 1 is a data storage area that stores image data and a program and data used for various kinds of processing, and can be also used as a buffer area used for computation at the time of various kinds of processing, and so on.

The display unit 16 and the operation unit 17 form a user interface. The display unit 16 presents various kinds of display to a user, and the user can send various operation instruction signals through the operation unit 17. Therefore, the user transmits the operation instruction signals to the control unit 14 through the operation unit 17 while confirming information presented on the display unit 16, and can control various kinds of processing in the imaging unit 11, the image processing unit 22, the memory 15, the display unit 16 and the signal input/output I/F 18, and so on.

The signal input/output I/F 18 forms a data input/output interface between the imaging device 10 and external machinery. Therefore, image data (such as RAW data or image data after image processing) imaged and acquired by the imaging unit 11 can be output to external machinery through the signal input/output I/F 18.

The control unit 14 is a part to generally control various kinds of machinery forming the imaging device 10, and is configured with a CPU (central processing unit) and other peripheral circuits. Therefore, various kinds of processing such as imaging processing in the imaging unit 11, image processing in the image processing unit 22, writing processing and reading processing with respect to the memory 15, display processing in the display unit 16, processing of operation signals from the operation unit 17 and input/output processing through the signal input/output I/F 18 are generally controlled by the control unit 14.

Next, a specific image processing example in the image processing unit 22 is described.

Figure 2:
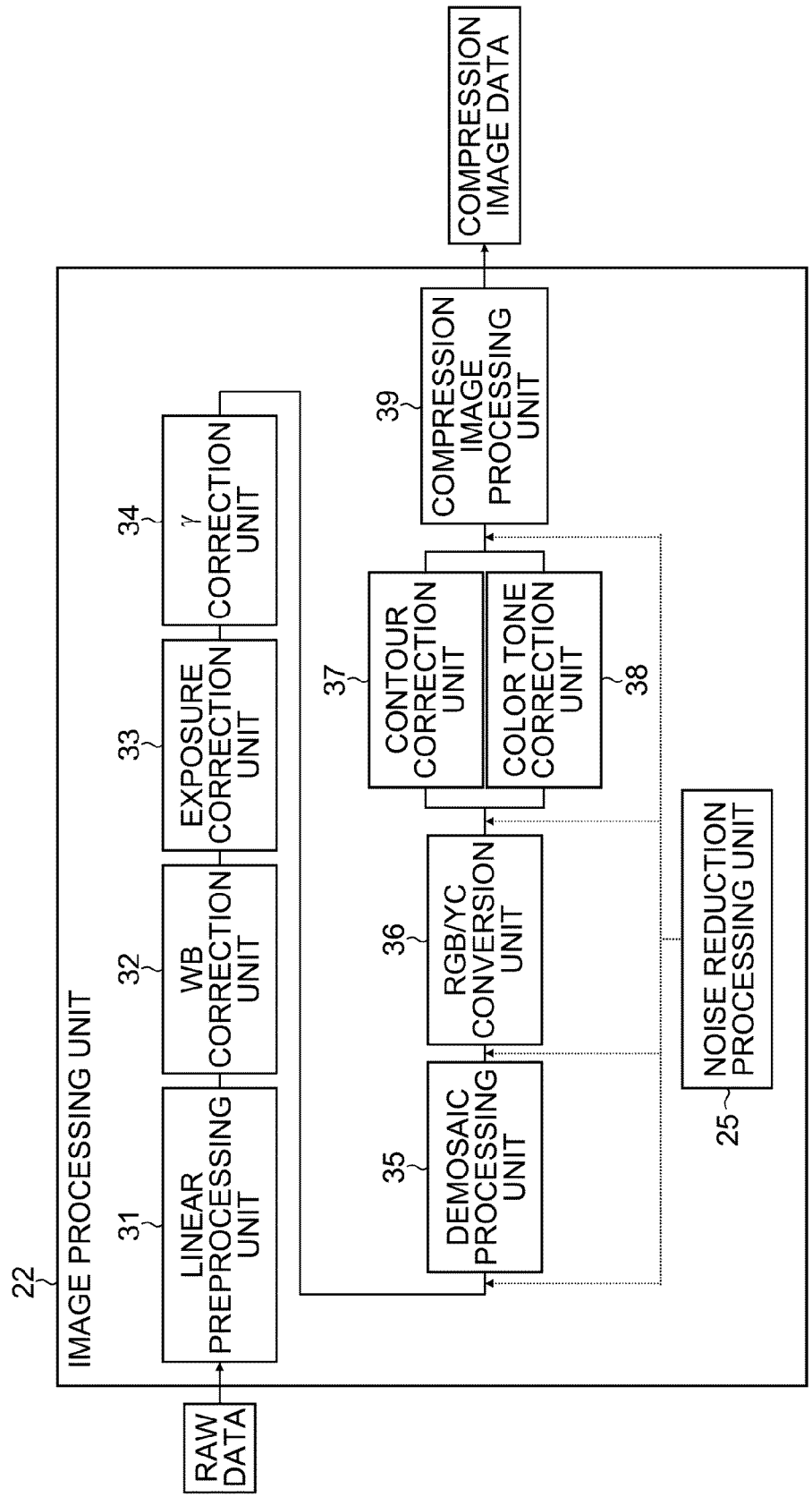
FIG. 2 is a functional block diagram illustrating one example of digital processing in an image processing unit.

FIG. 2 is a functional block diagram illustrating one example of digital processing in the image processing unit 22.

The imaging data (RAW data) imaged and generated in the imaging unit 11 includes color data of R (red), G (green) and B (blue) of 14 bits for example, and is input to a linear preprocessing unit 31 of the image processing unit 22 in order from R, G and B. The RAW data of R, G and B is subjected to preprocessing with respect to linear data like offset adjustment, conversion to 16 bits and shading compensation, and so on, in the linear preprocessing unit 31.

R, G, and B data output from the linear preprocessing unit 31 is input to a white balance (WB) correction unit 32. The WB correction unit 32 performs white balance correction by multiplying the R, G and B data by gain values Rg, Gg and Bg for white balance correction respectively. Here, regarding the gain values Rg, Gg and Bg for white balance correction, RAW data is analyzed to specify, for example, a light source type (such as sunlight, a fluorescent lamp or a tungsten lamp), gain values Rg, Gg and Bg which are stored beforehand are set according to the light source type or gain values Rg, Gg and Bg corresponding to a light source type or color temperature manually selected on a menu screen for performing white balance correction are set.

The R, G and B data output from the WB correction unit 32 is input to an exposure correction unit 33. The exposure correction unit 33 makes corrections to underexpose (desensitization processing) or over expose (sensitization processing) with respect to a normal exposure (exposure in a case where exposure correction is not performed) according to a manual instruction input of an exposure correction value (for example, −3EV to +3EV).

The R, G and B data output from the exposure correction unit 33 is input to a gamma (γ) correction unit 34, and the linear data is converted into tone data of the color space like sRGB, AdobeRBG and scRGB here. The R, G and B data which has been subjected to gamma correction is output to a demosaic processing unit 35 (synchronization processing unit).

The demosaic processing unit 35 performs processing of interpolating a spatial gap of R, G and B data caused by the color filter array in an imaging element and converting the R, G and B data into a synchronous system, and outputs demosaiced (synchronized) R, G and B data to an RGB/YC conversion unit 36.

The RGB/YC conversion unit 36 converts the R, G and B data into luminance data (luminance signal) Y and color difference data (color difference signal) Cr and Cb, outputs the luminance data Y to an contour correction unit 37 and outputs the color difference data Cr and Cb to a color tone correction unit 38. The contour correction unit 37 performs processing of emphasizing a contoured part (part with a large intensity change) of luminance data Y. The color tone correction unit 38 performs matrix operation between input color difference data Cr and Cb and color correction matrix coefficients of 2 rows×2 columns to perform color correction so as to realize excellent color reproducibility. The color correction matrix coefficients are arbitrarily changed according to an instruction input of color correction from a user.

A compression image processing unit 39 is an image processing unit that compresses image data on the basis of a compression parameter. The compression image processing unit 39 of this example performs compression processing on the basis of luminance data Y which has been subjected to contour correction and color difference data Cr and Cb which has been subjected to color tone correction, to generate compression image data of the JPEG format, or the like.

Compression image data which has been subjected to various kinds of image processing and image compression processing in the image processing unit 22 is subjected to output control by the control unit 14, and thereby the compression image data is stored in the memory 15, a minified image of the compression image data is displayed on the display unit 16 and the compression image data is output to the outside through the signal input/output I/F 18.

Here, these linear preprocessing unit 31, WB correction unit 32, exposure correction unit 33, γ correction unit 34, demosaic processing unit 35, RGB/YC conversion unit 36, contour correction unit 37, color tone correction unit 38 and compression image processing unit 39 are configured by the image processing circuit 24 in FIG. 1.

In this example, in addition to above-mentioned various kinds of image processing, noise reduction processing by the noise reduction processing unit 25 is performed at an appropriate timing. The timing at which the noise reduction processing is performed is not particularly limited, but it is preferable to perform the noise reduction processing on data which has been subjected to various kinds of processing before demosaic processing, and it is possible to perform the noise reduction processing at an arbitrary timing (for example, "between demosaic processing and RGB/YC conversion processing", "between RGB/YC conversion processing and contour correction processing/color tone correction processing" and "between contour correction processing/color tone correction processing and image compression processing", and so on) after the demosaic processing (demosaic processing unit 35) and before the image compression processing (compression image processing unit 39). In particular, in a case where the contour correction processing (contour correction unit 37) based on luminance data and the color tone correction (color tone correction unit 38) based on color difference data, and so on, are performed, since there is a possibility that noise is emphasized by these processing, it is preferable to perform the noise reduction processing before these processing.

Noise Reduction Processing

Next, the noise reduction processing is described.

Figure 3:
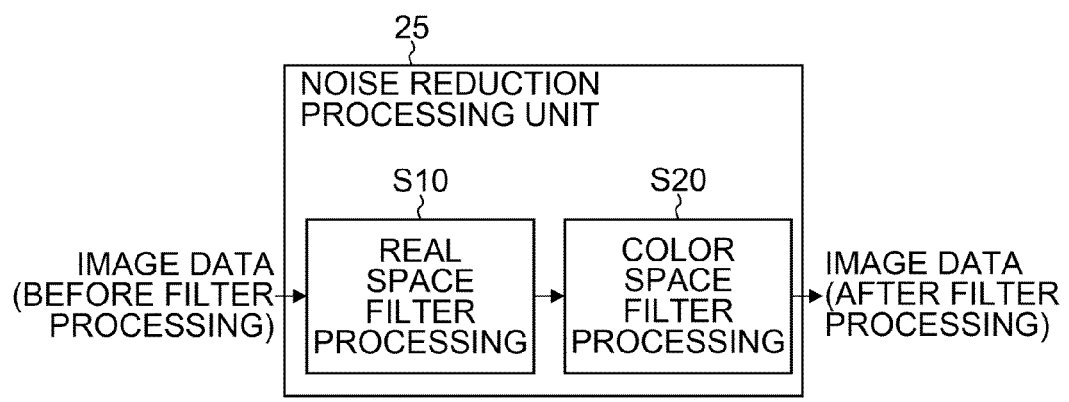
FIG. 3 is a block diagram illustrating the flow of noise reduction processing.

FIG. 3 is a block diagram illustrating a flow of the noise reduction processing. The noise reduction processing of this example includes real space filter processing (S10 in FIG. 3: real space filter processing step) by the real space filter processing unit 26 in the former stage, and color space filter processing (S20: color space filter processing step) by the color space filter processing unit 27 in the latter stage.

The real space filter processing is processing of calculating a real space weighting coefficient for a target pixel and each peripheral pixel on the basis of "distance on the real space" between the target pixel and the peripheral pixels located around this target pixel among a plurality of pixels in input image data, and performs weighted average of pixel data of the target pixel and pixel data of the peripheral pixels by use of this real space weighting coefficient to calculate the pixel data of the target pixel.

On the other hand, the color space filter processing is processing of calculating a color space weighting coefficient for a target pixel and each peripheral pixel on the basis of "distance on the color space" between the target pixel and the peripheral pixels located around this target pixel among a plurality of pixels, and performs weighted average of pixel data of the target pixel and pixel data of the peripheral pixels by use of this color space weighting coefficient to calculate the image data of the target pixel.

Therefore, by being subjected to the color space filter processing based on the distance on the color space after being subjected to the real space filter processing based on the distance on the real space, image data input to the noise reduction processing unit 25 is output from the noise reduction processing unit 25 in a state where image noise is reduced.

Here, image data before being input to the noise reduction processing unit 25 and image data after being output from the noise reduction processing unit 25 are stored and preserved in the memory 15.

Real Space Filter Processing

Next, details of the real space filter processing are described.

"Distance on the real space" here means an index that reflects the actual distance on the image between a plurality of pixels of image data, and directly or indirectly indicates the distance between a processing object pixel (target pixel) and other peripheral pixels (peripheral pixels). Therefore, it can say that the actual distance between pixels is directly "distance on the real space", and it can also say that what indirectly indicates the actual distance between pixels by use of another index (parameter) showing the actual distance between pixels is "distance on the real space".

FIG. 4 is a schematic diagram illustrating an array example of a plurality of pixels. Image data is configured with a set of pixel data of a plurality of pixels, and this image data (each pixel data) is subjected to image processing in the real space filter processing unit 26.

Regarding "distance on the real space" that becomes the base of processing in the real space filter processing unit 26, for example, in a case where a target pixel is denoted by "50A" in FIG. 4, the distance between the target pixel 50A and the "peripheral pixel 50B" in FIG. 4 on the real space corresponds to "three pixels", and the distance between the target pixel 50A and the "peripheral pixel 50C" in FIG. 4 on the real space corresponds to "five pixels".

Moreover, for example, the distance between the "peripheral pixel 50D" and the target pixel 50A in FIG. 4 corresponds to "$(3^2+3^2)^{1/2}$ pixels" in a precise sense. However, since the peripheral pixel 50D is located in the position separated by three pixels in the horizontal direction and vertical direction from the target pixel, weighting processing similar to that for another peripheral pixel (for example, the pixel 50B) of which the distance on the real space with respect to the target pixel corresponds to "three pixels" may be performed on this peripheral pixel 50D. Thus, strict "distance on the real space" need not be necessarily used, and a real space weighting coefficient may be determined by indirectly using "distance on the real space".

Next, regarding a specific example of the real space filter processing, a case is described where image data of the processing object includes image data related to luminance (luminance data Y) and image data related to color difference (color difference data Cr and Cb) which are acquired by RGB/YC conversion processing (see the RGB/YC conversion unit 36 in FIG. 2).

With respect to each of the input luminance data and color difference data, the real space filter processing unit 26 calculates a real space weighting coefficient and performs weighted average to calculate pixel data.

The calculation of the real space weighting coefficient and the weighted average of the pixel data which are performed by the real space filter processing unit 26 of this example include filter processing of an edge preservation type, and in particular, the calculation of the real space weighting coefficient and the weighted average of the pixel data are performed on the image data related to color difference on the basis of the filter processing of an edge preservation type.

FIGS. 5A and 5B each exemplify a real space filter used in the real space filter processing. FIG. 5A illustrates a separation-type real space filter combining a horizontal one-dimensional 7-tap filter and a vertical one-dimensional 7-tap filter, and FIG. 5B illustrates a matrix-type (two-dimensional) real space filter configured with a 7×7-tap filter in the horizontal and vertical directions.

Of these real space filters, the real space filter illustrated in FIG. 5B forms a filter of an edge preservation type. That is, in a case where the real space filter illustrated in FIG. 5B is used, when the difference absolute value of pixel data between a target pixel (subject pixel) and a peripheral pixel is within a predetermined threshold, the average value of the image data (color difference data in this example) is calculated in the range of the set thereof. Therefore, a peripheral pixel having "pixel data of which the difference absolute value with respect to pixel data of the target pixel is within a predetermined threshold" becomes a use object pixel in the real space filter processing of the pixel data of the target pixel, but a peripheral pixel having "pixel data of which the difference absolute value with respect to pixel data of the target pixel exceeds the predetermined threshold" is excluded from use object pixels in the real space filter processing of the pixel data of the target pixel.

When a filter of an edge preservation type is used, it is possible to effectively suppress the occurrence of color spread and color loss in a color boundary and excellently reduce noise as compared with a case where a simple real space filter is used, even in a case where the pixel data of the target pixel and/or peripheral pixels includes noise of strong impulsiveness. In particular, by combining real space filter processing using a real space filter of an edge preservation type and color space filter processing in the subsequent stage, it is possible to synergistically reduce color noise that is often caused at the time of high-sensitivity photographing and excellently preserve an edge (color boundary part) included in an image.

In this example, the separation-type real space filter illustrated in FIG. 5A is used for luminance data, and the matrix-type real space filter illustrated in FIG. 5B is used for color difference data.

For example, in a case where the separation-type real space filter illustrated in FIG. 5A is applied to luminance data, weighted average calculation using the weighting coefficients (real space weighting coefficient: real space filter coefficient) illustrated in FIG. 5A is performed on the target pixel and peripheral pixels of the processing object. That is, regarding the horizontal direction, a weighting coefficient for the target pixel is set to "4", a weighting coefficient for peripheral pixels adjacent to positions separated by one pixel from the target pixel is set to "3", a weighting coefficient for the peripheral pixels of positions separated by two pixels from the target pixel in the horizontal direction is set to "2", and a weighting coefficient for the peripheral pixels of positions separated by three pixels from the target pixel in the horizontal direction is set to "1". A value acquired by dividing the product of these weighting coefficients and luminance data (pixel value) of corresponding pixels by the sum total of the weighting coefficients is assigned as luminance data (pixel value) of the target pixel. Similarly, for the vertical direction, weighting coefficients for the target pixel and peripheral pixels are calculated and the weighted average is calculated, and it is assigned as luminance data (pixel value) of the target pixel. Real space filter processing with respect to the luminance data has a high effect to clarify an edge (boundary part).

By combining computation by both filters of the horizontal one-dimensional filter and the vertical one-dimensional filter, while it is possible to relatively simplify the configuration of a computation processing circuit, real space filter processing is substantially performed in the horizontal and vertical directions (two-dimension) including the target pixel.

On the other hand, in a case where the matrix-type real space filter illustrated in FIG. 5B is applied to color difference data, weighted average calculation by the weighting coefficients (color space weighting coefficient: filter coefficient) illustrated in FIG. 5B is performed on the target pixel and peripheral pixels of the processing object. In the example illustrated in FIG. 5B, a weighting coefficient for all of M×M pixels (M=7 in this example) including the target pixel is set to "1", and a value acquired by dividing the product of these weighting coefficients and color difference data (pixel value) of corresponding pixels by the sum total of the weighting coefficients is assigned as color difference data (pixel value) of the target pixel.

In particular, in this example, the real space filter illustrated in FIG. 5B is configured as the above-mentioned filter of an edge preservation type, and if the difference absolute value between the target pixel (subject pixel) and a peripheral pixel is within a predetermined threshold, the average value of image data (color difference data in this example) is calculated in the range of the set thereof.

The real space filter processing unit 26 applies the real space filter processing using the filters illustrated in above-mentioned FIGS. 5A and 5B to luminance data and color difference data of all pixels while sequentially switching the target pixel. By this means, image data (luminance data and color difference data) subjected to the real space filter processing is calculated. The image data (luminance data and color difference data) output from the real space filter processing unit 26 may be sent to the color space filter processing unit 27 in the subsequent stage or stored in the memory 15.

Here, the above-mentioned real space filter processing is merely one example, and other processing based on the distance on the real space may be performed in the real space filter processing unit 26. For example, the filter coefficients of the real space filters illustrated in FIGS. 5A and 5B are merely one example, and another filter coefficient may be arbitrarily assigned to each of the target pixel and peripheral pixels according to other image processing and photographing conditions (such as the ISO sensibility and the white balance correction value) of image data, and so on. Moreover, the real space filters illustrated in FIGS. 5A and 5B use pixel values of 7×7 pixels including the target pixel, but the pixel values of a more or less number of pixels may be used.

Moreover, in the above explanation, an example has been described where a real space filter of an edge preservation type is applied only to color difference data, but it only has to perform real space weighting coefficient calculation and weighted average on at least color difference data on the basis of filter processing of an edge preservation type. Therefore, the real space filter of an edge preservation type as illustrated in FIG. 5B may be applied even to luminance data.

Color Space Filter Processing

Next, a specific example of color space filter processing is described.

In this example, a color space based on luminance (Y) and color difference (Cb/Cr) is used, processing object image data input to the color space filter processing unit 27 includes luminance data and color difference data. The color space filter processing unit 27 receives input of the luminance data and the color difference data, and performs color space weighting coefficient calculation and weighted average on the color difference data by use of the luminance data to calculate pixel data.

That is, the color space filter processing unit 27 uses the pixel data (luminance data and color difference data) calculated by the real space filter processing unit 26, as "pixel data used to acquire the distance on the color space between the target pixel and the peripheral pixel" and "pixel data used for weighted average using a color space weighting coefficient". The pixel data (luminance data and color difference data) calculated by the real space filter processing unit 26 may be directly transmitted from the real space filter processing unit 26 to the color space filter processing unit 27, and may be read out from the memory 15 in which image data having been subjected to real space filter processing is stored, by the color space filter processing unit 27 or the control unit 14 and be input to the color space filter processing unit 27.

First, the concept of the color space filter processing is described with reference to FIGS. 6A to 6D.

FIGS. 6A to 6D are conceptual diagrams illustrating one example of noise reduction processing based on distance on a color space. FIGS. 6A to 6D illustrate a case where image data (pixel data) of an arbitrary processing range (in FIG. 6A, a range of 5×5 pixels including the central target pixel and peripheral pixels therearound) is extracted from a color image of Y (luminance) and Cb/Cr (color difference).

Figure 6A:
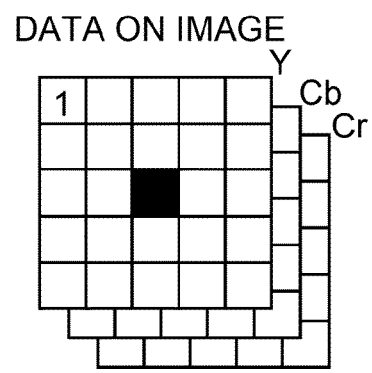
FIG. 6A is a conceptual diagram illustrating one example of noise reduction processing based on the distance on a color space.
Figure 6B:
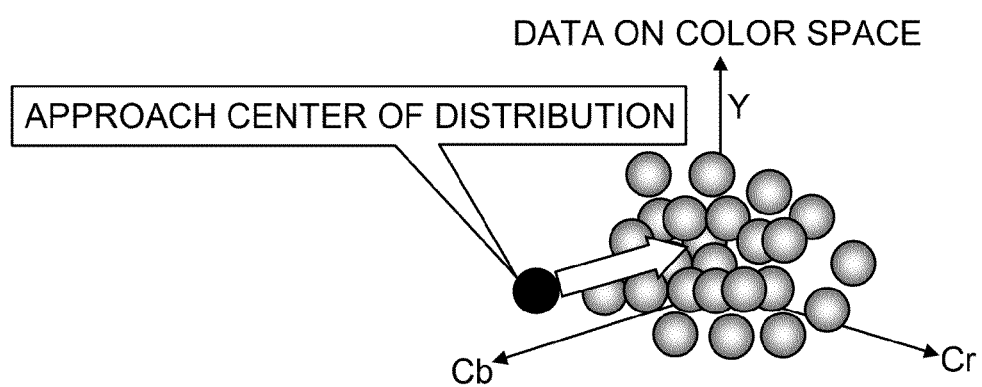
FIG. 6B is a conceptual diagram illustrating one example of noise reduction processing based on the distance on a color space.

FIG. 6B illustrates one example in which all pixels (5×5 pixels) of this extracted processing range are plotted on the Y/Cb/Cr color space.

Supposing the extracted processing range is a flat image (e.g. the brightness, hue and color saturation of the pixels are identical with each other), data plotted on the color space varies in a form similar to normal distribution. When this dispersion is assumed to be noise, to reduce the dispersion leads to the reduction of noise. Since the noise has dispersion similar to the normal distribution on the color space, the density of data becomes highest in the center of dispersion, and the density of data becomes lower as it is away from the center of dispersion.

Figure 6C:
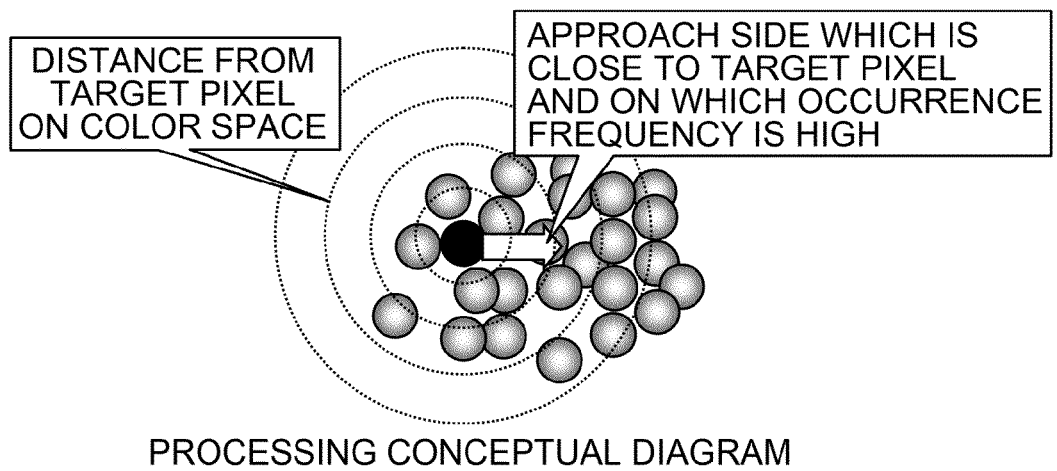
FIG. 6C is a conceptual diagram illustrating one example of noise reduction processing based on the distance on a color space.

Taking into account this, the center pixel of the extracted processing range is assumed to be a target pixel (object pixel), and the distance between the target pixel and all pixels (including the target pixel) in the processing range on the color space is calculated (see FIG. 6C).

Further, a peripheral pixel of which the distance on the color space is closer to the target pixel is considered to be more effective, and weighting to pixel data of the peripheral pixel is increased. Thus, weighting coefficients (color space weighting coefficient: color space filter coefficient) according to the distance on the color space is acquired for each of all pixels (5×5 pixels), and image data of the target pixel is calculated by performing weighted average of image data (pixel data) of all pixels (5×5 pixels) by use of the acquired weighting coefficients.

Figure 6D:
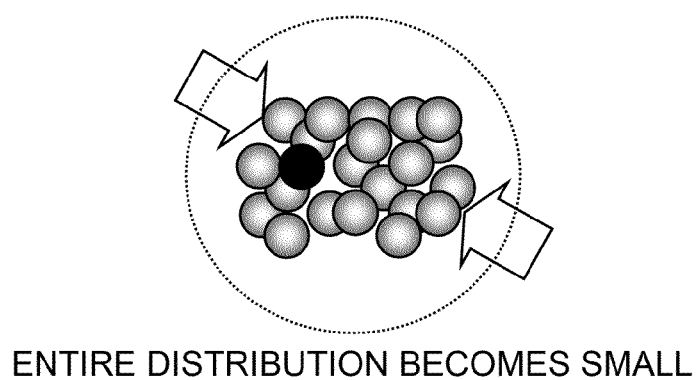
FIG. 6D is a conceptual diagram illustrating one example of noise reduction processing based on the distance on a color space.

By this means, it is possible to make the image data of the target pixel close to a higher density side on the color space. By applying such color space filter processing to all pixels in the same manner, it is possible to reduce the dispersion on the entire image on the color space and reduce noise (FIG. 6D).

Here, in a case where the above-mentioned processing range is on an edge, the image data plotted on the color space is divided into a plurality of pixel groups (a plurality of masses). In a case where the target pixel belongs to a certain pixel group, a weighting coefficient for pixels forming that pixel group becomes large because the pixels forming that pixel group have a distance close to the target pixel, and a weighting coefficient for pixels forming another pixel group is made small because the pixels forming another pixel group have a distance far from the target pixel. As a result, image data (pixel data) of the target pixel having been subjected to weighted average is not smoothed and an edge is excellently held.

For example, when high-sensibility photographing or the like is performed, much image noise occurs and therefore each pixel data is distributed in a state where dispersion on the color space is large, but FIGS. 6A to 6D illustrate the fact that it is possible to suppress the entire dispersion and perform noise reduction by making the target pixel close to a direction of high occurrence frequency as described above.

Next, a specific processing example of color space filter processing is described.

FIG. 7 is a diagram illustrating the relationship between real space filter processing and color space filter processing, and FIG. 8 is a diagram illustrating the flow of the calculation of filter coefficients for the color space filter.

Input image data (luminance data Y and color difference data Cb and Cr) is subjected to real space filter processing (S10 of FIG. 7) in the real space filter processing unit 26 and output to the color space filter processing unit 27.

In the color space filter processing unit 27, color space filter processing is performed (S20). Specifically, a filter coefficient for the color space filter is calculated from the image data (luminance data Y and color difference data Cb and Cr) input to the color space filter processing unit 27 (S21), and weighted average processing of filter coefficients on the color space is performed using this filter coefficient for the color space filter (S22).

A step of calculating a filter coefficient for the color space filter (S21) includes: a step of calculating the distance with respect to each of luminance data and color difference data on the color space (S211 in FIG. 8); a step of calculating the weighted sum of the distance related to the luminance data and the color difference data on the color space (S212); and a step of acquiring a weight (filter coefficient for the color space filter) according to the weighted sum of the distance related to the luminance data and the color difference data on the color space (S213).

One example of these S211 to 5233 is described with reference to Equations (1) to (4) below.

$$d_y = |Y \text{ data pixel value of subject pixel} - Y \text{ data pixel value of peripheral pixel}| \times \text{coefficient } A \quad \text{Equation (1)}$$

$$d_{cb} = |Cb \text{ data pixel value of subject pixel} - Cb \text{ data pixel value of peripheral pixel}| \times \text{coefficient } B \quad \text{Equation (2)}$$

$$d_{cr} = |Cr \text{ data pixel value of subject pixel} - Cr \text{ data pixel value of peripheral pixel}| \times \text{coefficient } C \quad \text{Equation (3)}$$

$$Dc = \text{coefficient } X \times (d_y + d_{cb} + d_{cr}) \quad \text{Equation (4)}$$

A step of calculating the distance related to each of luminance data and color difference data on the color space (S211) is performed by a distance calculation circuit of the color space filter processing unit 27. Specifically, distances $d_y$, $d_{cb}$ and $d_{cr}$ between a target pixel and a peripheral pixel thereof on the Y/Cb/Cr color space are calculated according to Equations (1) to (3) above, by use of image data of Y/Cb/Cr of a predetermined processing area (e.g. in FIGS. 6A to 6D, processing area of 5×5 pixels) centering on the target pixel.

That is, regarding each of the image data of Y/Cb/Cr, the absolute value of the difference between pixel data of the target pixel (subject pixel) and pixel data of the peripheral pixel (difference absolute value: distance on the color space) is acquired, coefficient A is multiplied by the absolute value of the difference of the Y image data (luminance data) to acquire distance $d_y$ related to Y on the color space, coefficient B is multiplied by the absolute value of the difference of the Cb image data (color difference data) to calculate distance $d_{cb}$ related to Cb on the color space, and coefficient C is multiplied by the absolute value of the difference of the Cr image data (color difference data) to calculate distance $d_{cr}$ related to Cr on the color space.

Further, the distance calculation circuit calculates the weighted sum of the distance related to the luminance data and the color difference data on the color space according to Equation (4) above (S212). That is, the sum of distances $d_y$, $d_{cb}$ and $d_{cr}$ calculated for the image data of Y/Cb/Cr respectively on the Y/Cb/Cr color space is acquired, and this sum is multiplied by coefficient X to acquire distance Dc from a peripheral pixel to the target pixel on the Y/Cb/Cr color space.

Here, coefficients A, B, C and X used in Equations (1) to (4) above are values to determine the weight of each pixel data, and may be design values individually defined on the basis of a specific apparatus and a photographing environment, and so on. For example, in the color space filter processing, the value of coefficient A in Equation (1) relatively increases in a case where the influence of Y (luminance) is valued, the value of coefficient B in Equation (2) relatively increases in a case where the influence of Cb (color difference) is valued, and the value of coefficient C in Equation (3) relatively increases in a case where the influence of Cr (color difference) is valued. Moreover, in a case where the entire influence of these image data (luminance data/color difference data) in the color space filter processing is valued, the value of coefficient X in Equation (4) relatively increases. Meanwhile, in a case where the influence of the weight of each pixel data is reduced, a corresponding coefficient among these coefficients A, B, C and X relatively decreases.

Further, a step of acquiring a weight (filter coefficient for the color space filter) according to weighted sum Dc of the distance related to the luminance data and the color difference data on the color space (S213) is performed in the weighting coefficient calculation circuit of the color space filter processing unit 27.

Figure 9:
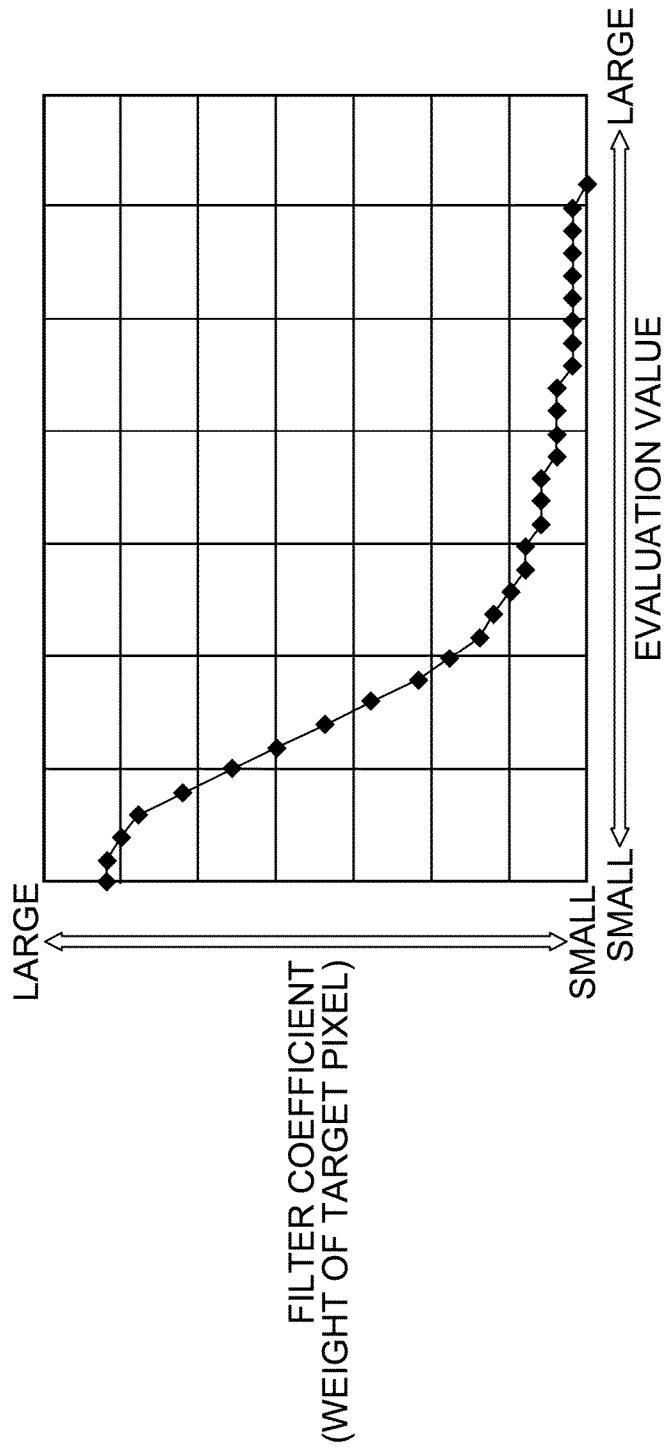
FIG. 9 is one example of a graph illustrating the relationship between distance and a weighting coefficient on a color space.

FIG. 9 is one example of a graph showing the relationship between the distance on the color space and a weighting coefficient, where the X axis shows the distance (evaluation value: calculation result Dc by Equation (4)) on the color space and the Y axis shows a filter coefficient for a color space filter (weight of an object pixel).

As illustrated in FIG. 9, the weighting coefficient calculation circuit derives a weighting coefficient in such a manner that the weighting coefficient (filter coefficient for the color space filter) of a peripheral pixel of which the distance from the target pixel on the color space is short becomes large and the weighting coefficient of a peripheral pixel of which the distance from the target pixel on the color space is long becomes small. Here, in a case where the weighting coefficient of a subject pixel is acquired, all of distances $d_y$, $d_{cb}$, $d_{cr}$ and Dc on the color space which are calculated according to Equations (1) to (4) above are assumed to be "0", and the largest weighting coefficient is assigned to the subject pixel. Here, the weighting coefficient assigned to the subject pixel may be assumed to be "0" in such a manner that the pixel value of the subject pixel is determined from pixel data of peripheral pixels other than the subject pixel.

The weighting coefficient calculation circuit may store a function of "distance on the color space (evaluation value)–weighting coefficient (filter coefficient)" as illustrated in the graph of FIG. 9, and the weighting coefficient may be calculated by using the distance on the color space according to this function. Alternatively, the weighting coefficient calculation circuit may include a lookup table (LUT) that stores the input/output relationship illustrated in the graph of FIG. 9, and a weighting coefficient according to the distance on the color space may be read out from this LUT.

A series of these processes are performed for each of all pixels (e.g. in FIGS. 6A to 6D, 5×5 pixels) of the object target pixel and peripheral pixels to calculate filter coefficients for the color space filter with respect to the target pixel and the respective peripheral pixels.

The weighted average processing circuit of the color space filter processing unit 27 performs weighted average processing based on the filter coefficient on the color space on color difference (Cb, Cr) data by use of the calculated filter coefficient for the color space filter (S22). That is, the weighted average processing circuit performs weighted average on the image data (color difference pixel value) of each pixel by use of the weighting coefficients of the target pixel and peripheral pixels calculated by the weighting coefficient calculation circuit, and calculates the pixel value after noise removal processing of the target pixel. Using the position on an image of the target pixel as (x, y), in a case where 5×5 pixels are assumed to be object pixels of color space filter processing as illustrated in FIGS. 6A to 6D, the weighted average processing circuit performs calculation according to the following equation.

Pixel value after processing$(x, y) =$ Equation (5)

$$\frac{\sum \{\text{Weighting coefficient}(x+i, y+i) \times \text{Pixel value } (x+i, y+i)\}}{\sum \text{Weighting coefficient}(x+i, y+i)}$$

(where $-2 \le i \le 2$ and $-2 \le j \le 2$)

The above-mentioned distance calculation circuit, weighting coefficient calculation circuit and weighted average processing circuit, included in the color space filter processing unit 27, perform processing over all pixels of a color image (image data) while moving the position (x, y) of the target pixel on the image. By this means, image data related to color difference (Cb, Cr) is calculated in the color space filter processing unit 27.

As described above, image data (luminance data/color difference data) input to the noise reduction processing unit 25 is subjected to the real space filter processing and the color space filter processing, and luminance data after processing in the real space filter processing unit 26 and color difference data after processing in the color space filter processing unit 27 are output from the noise reduction processing unit 25.

The image data of Y/Cb/Cr subjected to noise reduction processing in the noise reduction processing unit 25 is compressed into predetermined compression image data (for example, JPEG format) (see compression image processing unit 39 in FIG. 2), and recorded in a recording medium, and so on.

As described above, according to the present embodiment, real space filter processing including "filtering processing of an edge preservation type" is performed before color space filter processing. Further, the color space filtering processing is performed in the subsequent stage by use of the image data (pixel data) having been subjected to the real space filtering processing of an edge preservation type. By combining "real space filter processing of an edge preservation type" and "color space filter processing", it is possible to enhance an effect of noise reduction while excellently maintaining the edge preservability.

Variation Example

A preferred embodiment of the present invention is described above, but the present invention is not limited to the above-mentioned embodiment and is arbitrarily applicable to other modes.

For example, in the above-mentioned embodiment, an example has been described where pixel data calculated by the real space filter processing unit is used as pixel data used in the color space filter processing unit 27, but it might be enough that pixel data of at least a target pixel of the pixel data used in the color space filter processing unit 27 is the pixel data calculated by the real space filter processing unit.

Therefore, of pixel data which the color space filter processing unit 27 uses to calculate the distance on the color space between the target pixel and the peripheral pixel, "pixel data of the target pixel" is pixel data which the real space filter processing unit 26 calculates from input image data, but "pixel data of peripheral pixels" may be pixel data forming image data before being input to the real space filter processing unit 26.

Moreover, of pixel data which the color space filter processing unit 27 uses for weighted average based on a color space weighting coefficient, "pixel data of the target pixel" is pixel data which the real space filter processing unit 26 calculates from input image data, but "pixel data of peripheral pixels" may be pixel data forming image data before being input to the real space filter processing unit 26.

Thus, by using pixel data forming image data before being input to the real space filter processing unit 26 as pixel data of peripheral pixels, there is an aspect that maintains the original details of the image effectively. Here, the pixel data forming the image data before being input to the real space filter processing unit 26 can be stored in the memory 15 and acquired by being arbitrarily read out from the memory 15 by the control unit 14 or the color space filter processing unit 27.

Moreover, in the above-mentioned embodiment, peripheral pixels that are objects of pixel data used in each of the real space filter processing unit 26 and the color space filter processing unit 27 are adjacent to each other (7×7 pixels or 5×5 pixels), and are adjacent to at least any of the target pixel and other peripheral pixels that are objects of the pixel data used in each of the real space filter processing unit 26 and the color space filter processing unit 27. However, the peripheral pixels are not necessarily adjacent to each other, and spaced-apart peripheral pixels may be used.

Figure 10:
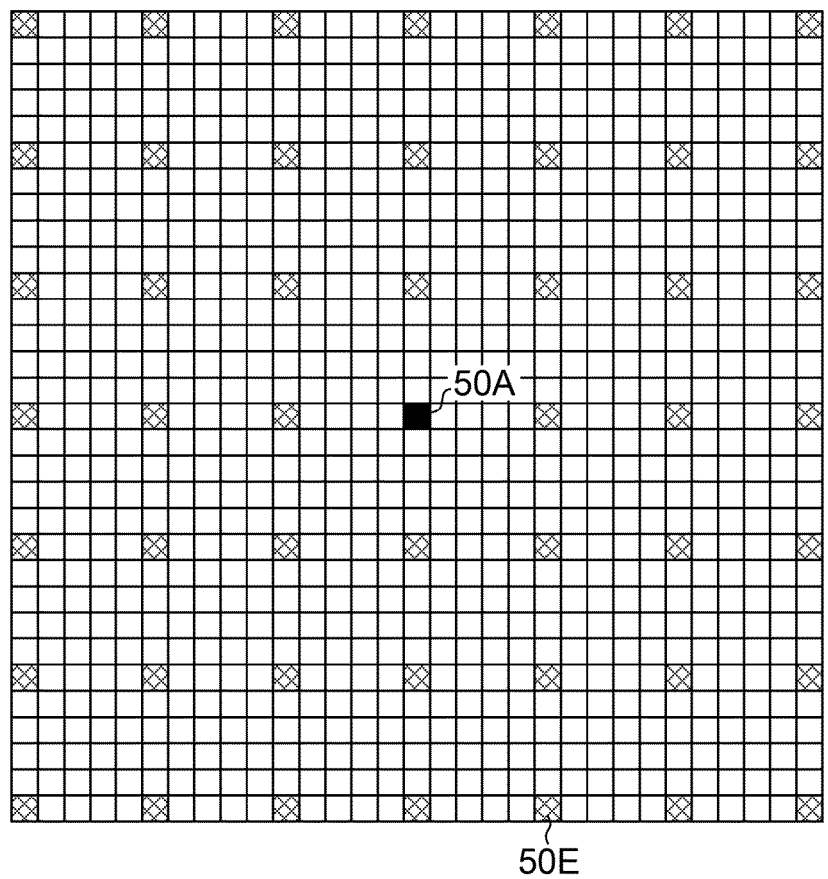
FIG. 10 is a diagram illustrating another disposition example of a target pixel and peripheral pixels in a color space filter processing unit.

FIG. 10 is a diagram illustrating another disposition example of a target pixel and peripheral pixels in the color space filter processing unit 27. In FIG. 10, a central target pixel 50A and peripheral pixels 50E are configured with 7×7 (=49) pixels, the target pixel and peripheral pixels juxtaposed in the horizontal direction and vertical direction are located at intervals corresponding to five pixels. Therefore, each peripheral pixel 50E that is the object of pixel data used in the color space filter processing unit 27 is not adjacent to any of the target pixel 50A and other peripheral pixels 50E that are objects of pixel data used in the color space filter processing unit 27.

By using spaced-apart peripheral pixels, it is possible to perform color space filter processing on the basis of wide-range image data while suppressing the calculation amount of the color space filter processing. Since the color components (including a color difference component) in the image data generally tend to be low frequency components, by performing color space filter processing on image data related to color components on the basis of image data over a wide range as illustrated in FIG. 10, a more excellent noise reduction effect may be expected.

Moreover, in the above-mentioned embodiment, a case has been described where the color space is based on luminance/color difference (Y/Cb/Cr) data, but the color space may be defined by other color elements, and, for example, a color space based on RGB may be used. In this case, it is preferable that image data of each of RGB is input to the real space filter processing unit 26 and the color space filter processing unit 27 and the image data of each of RGB is subjected to real space filter processing and color space filter processing. Moreover, in this case, it is preferable that the color space filter processing unit 27 performs the color space filter processing on the basis of the sum total of the distance related to all colors of RGB on the color space. Even in a case where image processing of RGB data is performed in that manner, it is possible to suppress the dispersion of data in RGB and effectively reduce color noise and luminance noise.

In a case where the image data of RGB is input to the real space filter processing unit 26 and the color space filter processing unit 27, noise reduction processing may be performed before or after demosaic processing (see the demosaic processing unit 35 in FIG. 2), and by performing the noise reduction processing after the demosaic processing, the processing process can be more simplified.

In a case where the processing object in the real space filter processing unit 26 and the color space filter processing unit 27 is the image data of RGB, image data related to luminance may be further used in addition to the image data related to colors of RGB. In this case, the real space filter processing unit 26 performs real space weighting coefficient calculation and pixel data weighted average on at least image data related to colors out of image data related to luminance Y and image data related to colors, on the basis of filter processing of an edge preservation type. Moreover, the color space filter processing unit 27 can acquire the distance on the color space from pixel data of a target pixel and peripheral pixels by use of image data related to colors of RGB and image data related to luminance Y calculated by the real space filter processing unit 26, and perform weighted average processing based on this distance. By performing color space filter processing by use of luminance data, it is possible to reduce noise while effectively suppressing the dispersion of data between RGB, even in a case where image processing of RGB data instead of color difference data is performed in this way.

Moreover, in the above-mentioned embodiment, an example has been described where the range of peripheral pixels is set to 5×5 pixels or 7×7 pixels, but the range of peripheral pixels is not limited to these ranges, and any processing range of a plurality of processing ranges having different sizes respectively may be selected on the basis of a photographing mode to image and acquire image data or photographing conditions, and so on. For example, in a case where photographing is performed at high sensitivity, since the gain of an image signal is increased and noise becomes large, it is preferable to be designed in such a manner that a processing range selection circuit selects a large processing range as a processing range including a target pixel and peripheral pixels at the time of high-sensibility photographing. By enlarging the processing range in this way, since noise reduction processing of the target pixel is performed on the basis of information on wide-range peripheral pixels, a large noise reduction effect can be expected. Meanwhile, in a case where the processing speed is fastened like a continuous imaging mode or in the case of a low power consumption mode, it is preferable to be designed in such a manner that the processing range selection circuit selects a small processing range as a processing range including the target pixel and peripheral pixels in order to reduce the image processing amount.

Moreover, in the above-mentioned embodiment, an example has been described where color space filter processing based on a single color space (YCbCr color space or RGB color space) is performed, but color space filter processing of a plurality of types may be combined. For example, the color space filter processing unit 27 can perform both processing of "color space filter processing of RGB data based on the RGB color space" and "color space filter processing of luminance data/color difference data based on the YCbCr color space". That is, "color space filter processing of RGB data based on the RGB color space" may be performed before RGB/YC conversion processing (see the RGB/YC conversion unit 36 in FIG. 2), and "color space filter processing of luminance data/color difference data based on the YCbCr color space" may be performed after RGB/YC conversion processing. Thus, by performing noise reduction processing of different color spaces, it is possible to effectively reduce noise of different characteristics.

Moreover, the color space filter processing unit 27 may set different weighting coefficients for respective color channels. For example, since color noise becomes remarkable at the time of high-sensibility photographing, the color space filter processing unit 27 may make a weighting coefficient for color difference data Cb and Cr at the time of high-sensitivity photographing larger than that at the time of normal photographing. Meanwhile, since noise of luminance data becomes large if edge enhancement processing is performed on the luminance data, a weighting coefficient for the luminance data may be made larger than the weighting coefficient for the color difference data at the time of normal photographing.

Moreover, in color space filter processing, a peripheral pixel of which distance on the color space is a medium distance may be valued, and weighting coefficients may be calculated in such a manner that a weighting coefficient for the peripheral pixel of the medium distance becomes large. Uniformly distributed noise can be reduced by increasing the weight of the pixel values of peripheral pixels (including the target pixel) of which distance on the color space is a short distance, but, since noise of strong impulsiveness is easily subject to the influence of the pixel value of itself (target pixel), a noise reduction effect directed to such strong impulsive noise can become small in similar processing. By increasing a weighting coefficient for a peripheral pixel of which distance on the color space is a middle distance, it can be made less likely to be subject to the influence even if pixel data of the target pixel includes a noise component of strong impulsiveness, and therefore it is possible to increase the noise reduction effect.

Moreover, the color space filter processing unit 27 may include a nonlinear conversion circuit that performs nonlinear conversion, and, by this nonlinear conversion circuit, relatively weak noise can be made remain in image data while relatively strong noise can be removed from the image data. That is, in the nonlinear transformation circuit, subtraction of image data before color space filter processing is applied (original image data) and image data after the color space filter processing is applied (post-processing image data) is performed, and the difference value (subtraction value) showing the noise component is calculated. Of this difference value, a part showing weak noise of a relatively small value is not output, and only a part showing strong noise of a relatively large value is output from the nonlinear transformation circuit. The output value from this nonlinear conversion circuit may be applied to original image data in a subtraction circuit and only the strong noise component may be subtracted from the original image data. Thus, it is possible to leave the details of the image by making the relatively weak noise component remain in the image data, and the relatively strong noise component which is visually remarkable is removed from the image data.

Moreover, a digital camera has been described in the above-mentioned embodiment, but the configuration of a photographing apparatus is not limited to this. Other photographing apparatuses (imaging apparatuses) to which the present invention is applicable includes, for example, a built-in type or external type PC camera and a portable terminal apparatus having a photograph function. Moreover, the present invention is applicable to a program that causes a computer to execute above-mentioned processing steps. When image data (RAW data and compression image data, and so on) is transmitted from an imaging device to computers (including a computer in which the program that causes each processing step to be executed is installed) to which the present invention is applied, the above-mentioned noise reduction processing and the like is performed in the computers.

Examples of the portable terminal apparatus including the image processing apparatus of the present invention include a portable telephone, a smartphone, PDA (Personal Digital Assistants) and a portable game machine.

Configuration of Smartphone

Figure 11:
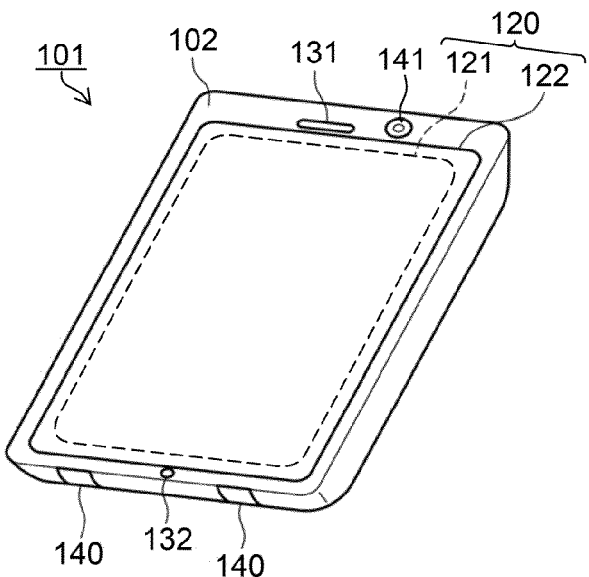
FIG. 11 is an outline view of a smartphone.

FIG. 11 illustrates the appearance of a smartphone 101 that is one embodiment of an imaging apparatus of the present invention. The smartphone 101 illustrated in FIG. 11 has a tabular chassis 102 and includes a display input unit 120 in which a display panel 121 as a display unit on one surface of the chassis 102 and an operation panel 122 as an input unit are unified. Moreover, the chassis 102 includes a speaker 131, a microphone 132, an operation unit 140 and a camera unit 141. Here, the configuration of the chassis 102 is not limited to this, and, for example, it is possible to adopt a configuration in which the display unit and the input unit are independent or a configuration having a folded structure or a sliding mechanism.

Figure 12:
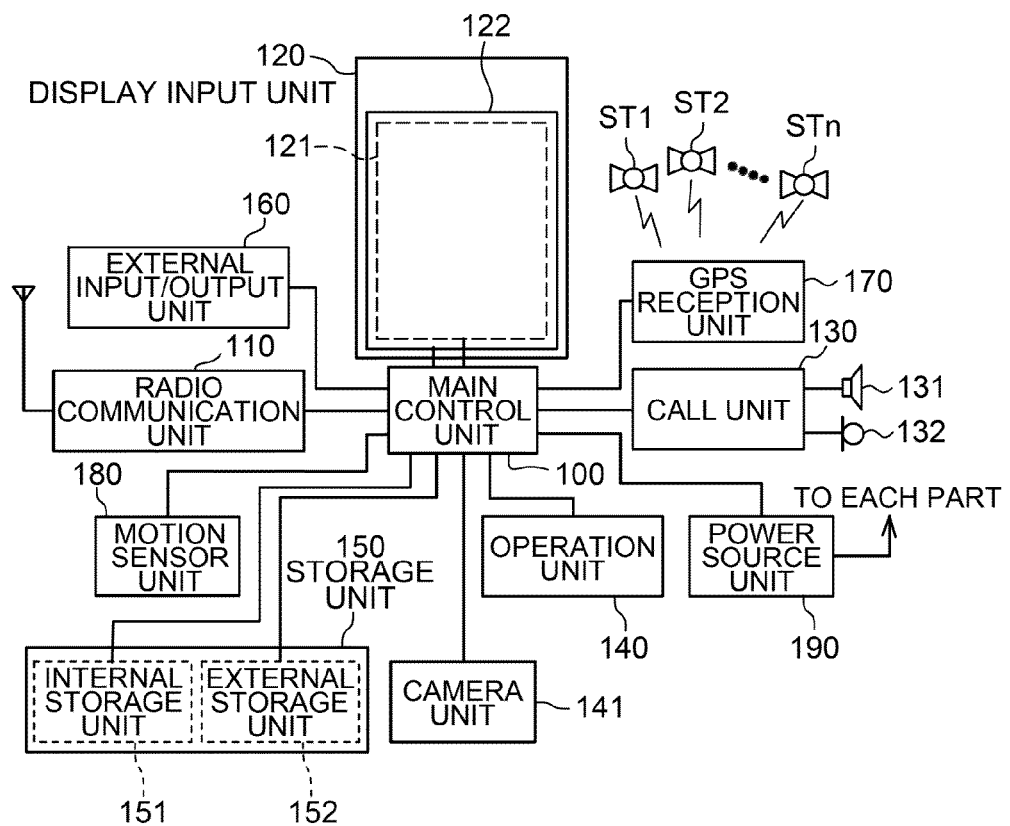
FIG. 12 is a block diagram illustrating the configuration of a smartphone.

FIG. 12 is a block diagram illustrating the configuration of the smartphone 101 illustrated in FIG. 11. As illustrated in FIG. 12, as main components of the smartphone, a radio communication unit 110, the display input unit 120, a call unit 130, the operation unit 140, the camera unit 141, a storage unit 150, an external input/output unit 160, a GPS (Global Positioning System) reception unit 170, a motion sensor unit 180, a power source unit 190 and a main control unit 100 are included. Moreover, as a main function of the smartphone 101, a radio communication function to perform mobile radio communication through base station apparatus BS and mobile communications network NW is included.

The radio communication unit 110 performs radio communication with base station apparatus BS accommodated in mobile communications network NW according to an instruction of the main control unit 100. By the use of the radio communication, various kinds of file data such as voice data and image data and email data, and so on are transmitted and received or web data and streaming data, and so on, are received.

The display input unit 120 is a so-called touch panel that displays images (still image and moving image) and character information, and so on, visually conveys information to the user and detects user operation with respect to the displayed information according to the control of the main control unit 100, and includes the display panel 121 and the operation panel 122.

Regarding the display panel 121, an LCD (Liquid Crystal Display), an OELD (Organic Electro-Luminescence Display) or the like is used as a display device. The operation panel 122 is a device which is placed such that an image displayed on the display screen of the display panel 121 is visualized and which detects one or a plurality of coordinates operated by user's finger or stylus. When the device is operated by user's finger or stylus, a generated detection signal caused by the operation is output to the main control unit 100. Next, the main control unit 100 detects the operation position (coordinates) on the display panel 121 on the basis of the received detection signal.

As illustrated in FIG. 11, the display panel 121 and the operation panel 122 of the smartphone 101 exemplified as one embodiment of the imaging apparatus of the present invention form the display input unit 120 in a unified fashion, but they are disposed such that the operation panel 122 completely covers the display panel 121. In a case where the disposition is adopted, the operation panel 122 may include a function to detect user's operation even in an area outside the display panel 121. In other words, the operation panel 122 may include a detection area about an overlapping part that overlaps with the display panel 121 (hereafter referred to as a display area) and a detection area about the remaining outer edge part that does not overlap with the display panel 121 (hereafter referred to as a non-display area).

Here, the size of the display area and the size of the display panel 121 may be completely matched, and both of them do not have to be necessarily matched. Moreover, the operation panel 122 may include two response areas of the outer edge part and the remaining inner side part. In addition, the width of the outer edge part is arbitrarily designed according to the size of the chassis 102, and so on. Furthermore, as a position detection scheme adopted by the operation panel 122, there are a matrix switch scheme, a resistance film scheme, a surface elastic wave scheme, an infrared ray scheme, an electromagnetic induction scheme and an electrostatic capacitance scheme, and so on, and any scheme can be adopted.

The call unit 130 includes the speaker 131 and the microphone 132, converts user's voice input through the microphone 132 into voice data that can be processed in the main control unit 100 and outputs it to the main control unit 100, or decodes voice data received by the radio communication unit 110 or the external input/output unit 160 and outputs it from the speaker 131. Moreover, as illustrated in FIG. 11, for example, the speaker 131 can be mounted to the same surface as a surface in which the display input unit 120 is installed, and the microphone 132 can be mounted to the side surface of the chassis 102.

The operation unit 140 is a hardware key using a key switch, and so on, and receives an instruction from the user. For example, as illustrated in FIG. 11, the operation unit 140 is a push-button switch which is mounted to the side surface of the chassis 102 of the smartphone 101 and which is turned on when being pressed by a finger or the like and gets in an OFF state by restorative force of a spring or the like when the finger is taken off.

The storage unit 150 stores a control program or control data of the main control unit 100, application software, address data associated with the name or telephone number of a communicating party, data of transmitted and received email, web data downloaded by web browsing and downloaded content data, and so on, or temporarily stores streaming data, and so on. Moreover, the storage unit 150 is configured with an internal storage unit 151 incorporated in the smartphone and an external storage unit 152 having a detachable external memory slot. Here, each of the internal storage unit 151 and the external storage unit 152 forming the storage unit 150 is realized using a storage medium such as a memory of a flash memory type, hard disk type, multimedia card micro type or card type (for example, Micro SD (registered trademark) memory, and so on), a RAM (Random Access Memory) and a ROM (Read Only Memory).

The external input/output unit 160 plays the role of an interface with all external devices coupled with the smartphone 101, and directly or indirectly connects with other external devices by communication or the like (such as a universal serial bus (USB) and IEEE1394) or a network (such as the Internet, wireless LAN, Bluetooth (registered trademark), RFID (Radio Frequency Identification), infrared communication (infrared data association: IrDA) (registered trademark), UWB (Ultra Wideband) (registered trademark) and ZigBee (registered trademark)).

As an external device coupled with the smartphone 101, for example, there are a wired/wireless headset, a wired/wireless external battery charger, a wired/wireless data port, a memory card or SIM (Subscriber Identity Module Card)/UIM (User Identity Module Card) card connected through a card socket, an external audio/video device connected through an audio/video I/O (Input/Output) terminal, an external audio/video device connected by wireless, a smartphone connected by wire/wireless, a personal computed connected by wire/wireless, a PDA connected by wire/wireless, and earphones connected by wire/wireless, and so on. The external input/output unit may transmit data received from such an external device, to each component in the smartphone 101, or transmit data in the smartphone 101 to the external device.

The GPS reception unit 170 receives a GPS signal transmitted from GPS satellites ST1 to STn according to an instruction of the main control unit 100, performs positioning operation processing based on a plurality of received GPS signals and detects a position including the latitude, longitude and altitude of the smartphone 101. The GPS reception unit 170 can detect the position by use of position information when the position information can be acquired from the radio communication unit 110 or the external input/output unit 160 (for example, wireless LAN).

The motion sensor unit 180 includes an acceleration sensor of three axes, for example, and detects the physical movement of the smartphone 101 according to an instruction of the main control unit 100. By detecting the physical movement of the smartphone 101, the movement direction and acceleration of the smartphone 101 are detected. The detection result is output to the main control unit 100.

The power source unit 190 supplies power accumulated in a battery (not illustrated) to each part of the smartphone 101 according to an instruction of the main control unit 100.

The main control unit 100 includes a microprocessor, operates according to the control program or control data stored in the storage unit 150, and generally controls each part of the smartphone 101. Moreover, in order to perform voice communication or data communication through the radio communication unit 110, the main control unit 100 includes a mobile communication control function to control each part of the communication system and an application processing function.

The application processing function is realized by being operated by the main control unit 100 according to the application software stored in the storage unit 150. As the application processing function, for example, there are an infrared communication function to control the external input/output unit 160 and perform data communication with an opposite device, an email function to transmit and receive email, and a web browsing function to browse web pages, and so on.

Moreover, the main control unit 100 includes an image processing function to display an image on the display input unit 120, and so on, on the basis of image data (data of a still image or moving image) such as reception data and downloaded streaming data. The image processing function denotes a function that the main control unit 100 decodes the above-mentioned image data, applies image processing to the decoding result and displays an image on the display input unit 120.

In addition, the main control unit 100 performs display control with respect to the display panel 121 and operation detection control to detect user operation through the operation unit 140 and the operation panel 122.

By the execution of the display control, the main control unit 100 displays an icon to activate application software and a software key such as a scrollbar, or displays a window to create email. Here, the scrollbar denotes a software key to receive an instruction to move a display part of an image, regarding a large image that cannot be settled in the display area of the display panel 121.

Moreover, by the execution of the operation detection control, the main control unit 100 detects user operation through the operation unit 140, receives operation with respect to the above-mentioned icon or the input of a character string with respect to an input column of the above-mentioned window through the operation panel 122, or receives a scroll request of a display image through the scrollbar.

In addition, by the execution of the operation detection control, the main control unit 100 includes a touch panel control function to determine whether the operation position with respect to the operation panel 122 is an overlapping part (display area) that overlaps with the display panel 121 or it is the remaining outer edge part (non-display area) that does not overlap with the display panel 121, and control a response area of the operation panel 122 or the display position of the software key.

Moreover, the main control unit 100 can also detect gesture operation with respect to the operation panel 122 and execute a preset function according to the detected gesture operation. The gesture operation is not conventional simple touch operation and means operation to draw a trajectory by a finger, and so on, specify a plurality of positions at the same time or combine these to draw a trajectory of at least one of a plurality of positions.

The camera unit 141 is a digital camera that takes an electronic image by use of an imaging element such as a CMOS (Complementary Metal Oxide Semiconductor) and a CCD (Charge-Coupled Device). Moreover, by control of the main control unit 100, the camera unit 141 can convert image data acquired by imaging into compressed image data such as JPEG (Joint Photographic coding Experts Group), record it in the storage unit 150 and output it through the input/output unit 160 or the radio communication unit 110. In the smartphone 101 as illustrated in FIG. 11, the camera unit 141 is mounted to the same surface as the display input unit 120, but the mounting position of the camera unit 141 is not limited to this and may be mounted to the back surface of the display input unit 120 or a plurality of camera units 141 may be mounted. Here, in a case where a plurality of camera units 141 are mounted, it is possible to switch the camera unit 141 for photographing and take an image alone, or take images by using a plurality of camera units 141 at the same time.

Moreover, the camera unit 141 can be used for various functions of the smartphone 101. For example, it is possible to display an image acquired in the camera unit 141 on the display panel 121 or use the image of the camera unit 141 as one of operation inputs of the operation panel 122. Moreover, when the GPS reception unit 170 detects a position, it is possible to detect the position with reference to the image from the camera unit 141. Furthermore, with reference to the image from the camera unit 141, it is possible to determine the optical axis direction of the camera unit 141 of the smartphone 101 and determine the current usage environment without using the acceleration sensor of three axes or with using the acceleration sensor of three axes together. Naturally, it is possible to use the image from the camera unit 141 in application software.

Additionally, it is possible to attach position information acquired by the GPS reception unit 170, voice information (which may be text information by performing voice text conversion by the main control unit, and so on) acquired by the microphone 132 and attitude information acquired by the motion sensor unit 180, and so on, to image data of a still image or moving image and record it in the storage unit 150, or output it through the input/output unit 160 or the radio communication unit 110.

What is claimed is:

1. An image processing apparatus that processes image data formed by a set of pixel data of a plurality of pixels, the image processing apparatus comprising:
a real space filter processing unit that calculates a real space weighting coefficient for each peripheral pixel according to a distance on a real space between a target pixel and a peripheral pixel located around the target pixel among the plurality of pixels of image data input, and performs weighted average of pixel data of the target pixel and pixel data of the peripheral pixel using the real space weighting coefficient to calculate pixel data of the target pixel; and
a color space filter processing unit that calculates a color space weighting coefficient for each peripheral pixel according to a distance on a color space between a target pixel and a peripheral pixel located around the target pixel among the plurality of pixels, and performs weighted average of pixel data of the target pixel and pixel data of the peripheral pixel using the color space weighting coefficient to calculate pixel data of the target pixel, wherein:
the real space filter processing unit calculates the real space weighting coefficient and performs the weighted average of pixel data, according to filter processing of an edge preservation type;
the pixel data of at least the target pixel of the pixel data used in the color space filter processing unit is the pixel data calculated by the real space filter processing unit; and
of the pixel data which the color space filter processing unit uses for the weighted average with the color space weighting coefficient, the pixel data of the target pixel is the pixel data calculated by the real space filter processing unit, and the pixel data of the peripheral pixel is the pixel data forming the image data before being input to the real space filter processing unit.

2. An image processing apparatus that processes image data formed by a set of pixel data of a plurality of pixels, the image processing apparatus comprising:
a real space filter processing unit that calculates a real space weighting coefficient for each peripheral pixel according to a distance on a real space between a target pixel and a peripheral pixel located around the target pixel among the plurality of pixels of image data input, and performs weighted average of pixel data of the target pixel and pixel data of the peripheral pixel using the real space weighting coefficient to calculate pixel data of the target pixel; and
a color space filter processing unit that calculates a color space weighting coefficient for each peripheral pixel according to a distance on a color space between a target pixel and a peripheral pixel located around the target pixel among the plurality of pixels, and performs weighted average of pixel data of the target pixel and pixel data of the peripheral pixel using the color space weighting coefficient to calculate pixel data of the target pixel, wherein:
the real space filter processing unit calculates the real space weighting coefficient and performs the weighted average of pixel data, according to filter processing of an edge preservation type;
the pixel data of at least the target pixel of the pixel data used in the color space filter processing unit is the pixel data calculated by the real space filter processing unit; and
the target pixel and the peripheral pixel directed to the pixel data used in the color space filter processing unit are not adjacent to each other.

3. An image processing apparatus that processes image data formed by a set of pixel data of a plurality of pixels, the image processing apparatus comprising:
a real space filter processing unit that calculates a real space weighting coefficient for each peripheral pixel according to a distance on a real space between a target pixel and a peripheral pixel located around the target pixel among the plurality of pixels of image data input, and performs weighted average of pixel data of the target pixel and pixel data of the peripheral pixel using the real space weighting coefficient to calculate pixel data of the target pixel; and
a color space filter processing unit that calculates a color space weighting coefficient for each peripheral pixel according to a distance on a color space between a target pixel and a peripheral pixel located around the target pixel among the plurality of pixels, and performs weighted average of pixel data of the target pixel and pixel data of the peripheral pixel using the color space weighting coefficient to calculate pixel data of the target pixel, wherein:
the real space filter processing unit calculates the real space weighting coefficient and performs the weighted average of pixel data, according to filter processing of an edge preservation type;
the pixel data of at least the target pixel of the pixel data used in the color space filter processing unit is the pixel data calculated by the real space filter processing unit;
the color space is based on luminance and color difference;
the real space filter processing unit receives an input of image data related to luminance and image data related to color difference, and calculates the real space weighting coefficient and performs the weighted average to calculate the pixel data with respect to each of the image data related to luminance and the image data related to color difference;
the color space filter processing unit receives an input of the image data related to luminance and the image data related to color difference formed by a set of the pixel data calculated by the real space filter processing unit, and calculates the color space weighting coefficient and performs the weighted average with respect to the image data related to color difference using the image data related to luminance; and
image data related to luminance based on the pixel data calculated in the real space filter processing unit and image data related to color difference based on the pixel data calculated in the color space filter processing unit are output.

4. The image processing apparatus as defined in claim 1, wherein:
the image data includes image data related to color; and
the real space filter processing unit calculates the real space weighting coefficient and performs the weighted average of pixel data, with respect to the image data related to color, according to the filter processing of an edge preservation type.

5. The image processing apparatus as defined in claim 2, wherein:
the image data includes image data related to color; and
the real space filter processing unit calculates the real space weighting coefficient and performs the weighted average of pixel data, with respect to the image data related to color, according to the filter processing of an edge preservation type.

6. The image processing apparatus as defined in claim 3, wherein:
the image data includes image data related to color; and
the real space filter processing unit calculates the real space weighting coefficient and performs the weighted average of pixel data, with respect to the image data related to color, according to the filter processing of an edge preservation type.

7. The image processing apparatus as defined in claim 1, wherein:
the image data includes image data related to luminance and image data related to color difference; and
the real space filter processing unit calculates the real space weighting coefficient and performs the weighted average of pixel data, with respect to at least the image data related to color difference of the image data related to luminance and the image data related to color difference, according to the filter processing of an edge preservation type.

8. The image processing apparatus as defined in claim 2, wherein:
the image data includes image data related to luminance and image data related to color difference; and
the real space filter processing unit calculates the real space weighting coefficient and performs the weighted average of pixel data, with respect to at least the image data related to color difference of the image data related to luminance and the image data related to color difference, according to the filter processing of an edge preservation type.

9. The image processing apparatus as defined in claim 3, wherein:
the image data includes image data related to luminance and image data related to color difference; and
the real space filter processing unit calculates the real space weighting coefficient and performs the weighted average of pixel data, with respect to at least the image data related to color difference of the image data related to luminance and the image data related to color difference, according to the filter processing of an edge preservation type.

10. The image processing apparatus as defined in claim 1, wherein, of the pixel data which the color space filter processing unit uses to calculate the distance on the color space between the target pixel and the peripheral pixel, the pixel data of the target pixel is the pixel data calculated by the real space filter processing unit, and the pixel data of the peripheral pixel is the pixel data forming the image data before being input to the real space filter processing unit.

11. The image processing apparatus as defined in claim 2, wherein, of the pixel data which the color space filter processing unit uses to calculate the distance on the color space between the target pixel and the peripheral pixel, the pixel data of the target pixel is the pixel data calculated by the real space filter processing unit, and the pixel data of the peripheral pixel is pixel data forming the image data before being input to the real space filter processing unit.

12. The image processing apparatus as defined in claim 3, wherein, of the pixel data which the color space filter processing unit uses to calculate the distance on the color space between the target pixel and the peripheral pixel, the pixel data of the target pixel is the pixel data calculated by the real space filter processing unit, and the pixel data of the peripheral pixel is pixel data forming the image data before being input to the real space filter processing unit.

13. The image processing apparatus as defined in claim 2, wherein the color space filter processing unit calculates the distance on the color space between the target pixel and the peripheral pixel and performs the weighted average with the color space weighting coefficient, using the pixel data calculated by the real space filter processing unit.

14. The image processing apparatus as defined in claim 3, wherein the color space filter processing unit calculates the distance on the color space between the target pixel and the peripheral pixel and performs the weighted average with the color space weighting coefficient, using the pixel data calculated by the real space filter processing unit.

15. The image processing apparatus as defined in claim 1, wherein the target pixel and the peripheral pixel directed to the pixel data used in each of the real space filter processing unit and the color space filter processing unit are adjacent to each other.

16. The image processing apparatus as defined in claim 3, wherein the target pixel and the peripheral pixel directed to the pixel data used in each of the real space filter processing unit and the color space filter processing unit are adjacent to each other.

17. The image processing apparatus as defined in claim 1, wherein the color space is based on RGB.

18. The image processing apparatus as defined in claim 2, wherein the color space is based on RGB.

19. An image processing method that processes image data formed by a set of pixel data of a plurality of pixels, the image processing method comprising:
a real space filter processing step of calculating a real space weighting coefficient for each peripheral pixel according to a distance on a real space between a target pixel and a peripheral pixel located around the target pixel among the plurality of pixels of image data input, and performing weighted average of pixel data of the target pixel and pixel data of the peripheral pixel using the real space weighting coefficient to calculate pixel data of the target pixel; and
a color space filter processing step of calculating a color space weighting coefficient for each peripheral pixel according to a distance on a color space between a target pixel and a peripheral pixel located around the target pixel among the plurality of pixels, and performing weighted average of pixel data of the target pixel and pixel data of the peripheral pixel using the color space weighting coefficient to calculate pixel data of the target pixel, wherein:
in the real space filter processing step, the real space weighting coefficient is calculated and the weighted average of pixel data is performed, according to filter processing of an edge preservation type;
the pixel data of at least the target pixel of the pixel data used in the color space filter processing step is the pixel data calculated in the real space filter processing step; and
of the pixel data which the color space filter processing step uses for the weighted average with the color space weighting coefficient, the pixel data of the target pixel is the pixel data calculated in the real space filter processing step, and the pixel data of the peripheral pixel is pixel data forming the image data before the real space filter processing step.

20. An image processing method that processes image data formed by a set of pixel data of a plurality of pixels, the image processing method comprising:
   a real space filter processing step of calculating a real space weighting coefficient for each peripheral pixel according to a distance on a real space between a target pixel and a peripheral pixel located around the target pixel among the plurality of pixels of image data input, and performing weighted average of pixel data of the target pixel and pixel data of the peripheral pixel using the real space weighting coefficient to calculate pixel data of the target pixel; and
   a color space filter processing step of calculating a color space weighting coefficient for each peripheral pixel according to a distance on a color space between a target pixel and a peripheral pixel located around the target pixel among the plurality of pixels, and performing weighted average of pixel data of the target pixel and pixel data of the peripheral pixel using the color space weighting coefficient to calculate pixel data of the target pixel, wherein:
   in the real space filter processing step, the real space weighting coefficient is calculated and the weighted average of pixel data is performed, according to filter processing of an edge preservation type;
   the pixel data of at least the target pixel of the pixel data used in the color space filter processing step is the pixel data calculated in the real space filter processing step; and
   the target pixel and the peripheral pixel directed to the pixel data used in the color space filter processing step are not adjacent to each other.

21. An image processing method that processes image data formed by a set of pixel data of a plurality of pixels, the image processing method comprising:
   a real space filter processing step of calculating a real space weighting coefficient for each peripheral pixel according to a distance on a real space between a target pixel and a peripheral pixel located around the target pixel among the plurality of pixels of image data input, and performing weighted average of pixel data of the target pixel and pixel data of the peripheral pixel using the real space weighting coefficient to calculate pixel data of the target pixel; and
   a color space filter processing step of calculating a color space weighting coefficient for each peripheral pixel according to a distance on a color space between a target pixel and a peripheral pixel located around the target pixel among the plurality of pixels, and performing weighted average of pixel data of the target pixel and pixel data of the peripheral pixel using the color space weighting coefficient to calculate pixel data of the target pixel, wherein:
   in the real space filter processing step, the real space weighting coefficient is calculated and the weighted average of pixel data is performed, according to filter processing of an edge preservation type;
   the pixel data of at least the target pixel of the pixel data used in the color space filter processing step is the pixel data calculated in the real space filter processing step;
   the color space is based on luminance and color difference;
   in the real space filter processing step, an input of image data related to luminance and image data related to color difference is received, and the real space weighting coefficient is calculated and the weighted average is performed to calculate the pixel data with respect to each of the image data related to luminance and the image data related to color difference;
   in the color space filter processing step, an input of the image data related to luminance and the image data related to color difference formed by a set of the pixel data calculated in the real space filter processing step is received, and the color space weighting coefficient is calculated and the weighted average is performed with respect to the image data related to color difference using the image data related to luminance; and
   image data related to luminance based on the pixel data calculated in the real space filter processing step and image data related to color difference based on the pixel data calculated in the color space filter processing step are output.

* * * * *